(12) United States Patent
Burrows

(10) Patent No.: US 7,968,057 B2
(45) Date of Patent: Jun. 28, 2011

(54) AUTOCLAVE

(75) Inventor: Paul Burrows, Birmingham (GB)

(73) Assignee: Estech Europe Limited

( * ) Notice: Subject to any disclaimer, the term of this patent is extended or adjusted under 35 U.S.C. 154(b) by 588 days.

(21) Appl. No.: 11/791,413

(22) PCT Filed: Nov. 23, 2005

(86) PCT No.: PCT/GB2005/004497
§ 371 (c)(1),
(2), (4) Date: Nov. 16, 2007

(87) PCT Pub. No.: WO2006/056768
PCT Pub. Date: Jun. 1, 2006

(65) Prior Publication Data
US 2008/0253946 A1    Oct. 16, 2008

(30) Foreign Application Priority Data

Nov. 23, 2004 (GB) .................................. 0425684.8
Nov. 23, 2004 (GB) .................................. 0425686.3
Feb. 16, 2005 (GB) .................................. 0503215.6

(51) Int. Cl.
*A61L 2/00* (2006.01)
(52) U.S. Cl. ........................................................ 422/297
(58) Field of Classification Search ............... 422/184.1, 422/298, 299; 241/65, 299, 606
See application file for complete search history.

(56) References Cited

U.S. PATENT DOCUMENTS

| 3,010,581 | A |   | 11/1961 | Knapp et al. |
| 3,538,067 | A | * | 11/1970 | Bognar ............ 422/137 |
| 3,711,392 | A |   | 1/1973 | Metzger |
| 3,787,583 | A |   | 1/1974 | Hruby |
| 4,297,216 | A |   | 10/1981 | Ishida et al. |
| 4,342,830 | A |   | 8/1982 | Holloway |
| 4,657,681 | A |   | 4/1987 | Hughes et al. |
| 4,753,787 | A |   | 6/1988 | Krijgsman |
| 4,765,900 | A |   | 8/1988 | Schwoyer et al. |
| 4,844,351 | A |   | 7/1989 | Holloway |
| 4,974,781 | A |   | 12/1990 | Placzek |
| 4,997,568 | A |   | 3/1991 | Vandervelde et al. |
| 5,190,226 | A | * | 3/1993 | Holloway ............ 241/65 |
| 5,207,911 | A |   | 5/1993 | Pellegrin et al. |
| 5,427,650 | A |   | 6/1995 | Holloway |

(Continued)

FOREIGN PATENT DOCUMENTS

AT    000384009 T    2/2008

(Continued)

OTHER PUBLICATIONS

International Search Report for International Application No. PCT/GB2005/004497, dated May 15, 2006.

(Continued)

*Primary Examiner* — Walter D Griffin
*Assistant Examiner* — Timothy Cleveland
(74) *Attorney, Agent, or Firm* — Marshall, Gerstein & Borun LLP

(57) ABSTRACT

A waste treatment apparatus having an autoclave that includes a pressure vessel (11) having a first mouth part (20) to receive waste material and a second mouth part (19) to discharge treated material, with the autoclave being rotatable at a longitudinal axis to agitate the waste material during treatment and to discharge waste material from the autoclave.

38 Claims, 18 Drawing Sheets

U.S. PATENT DOCUMENTS

| | | | |
|---|---|---|---|
| 5,445,329 A | 8/1995 | Anderson | |
| 5,655,718 A | 8/1997 | Anderson | |
| 5,799,883 A * | 9/1998 | Lewis et al. | 241/65 |
| 6,007,719 A | 12/1999 | Yoo et al. | |
| 6,024,876 A | 2/2000 | Pannier et al. | |
| 6,143,176 A | 11/2000 | Nagamatsu et al. | |
| 6,251,643 B1 | 6/2001 | Hansen et al. | |
| 6,365,047 B1 | 4/2002 | Bischof et al. | |
| 6,379,527 B1 | 4/2002 | Vogt et al. | |
| 6,397,492 B1 * | 6/2002 | Malley | 241/15 |
| 6,423,532 B1 | 7/2002 | Rindelaub | |
| 6,730,223 B1 | 5/2004 | Anderson et al. | |
| 2004/0084366 A1 | 5/2004 | Anderson et al. | |

FOREIGN PATENT DOCUMENTS

| | | |
|---|---|---|
| DE | 44 15 017 A1 | 11/1995 |
| DE | 101 14 946 A1 | 10/2002 |
| EP | 0 031 939 A1 | 7/1981 |
| EP | 0 246 202 A | 11/1987 |
| EP | 0 931 553 A | 7/1999 |
| EP | 1 023 977 A1 | 8/2000 |
| EP | 1 161 876 A2 | 12/2001 |
| EP | 1 273 362 A1 | 1/2003 |
| EP | 1 946 829 A1 | 7/2008 |
| FR | 2 523 568 A1 | 9/1983 |
| GB | 1 117 549 A | 6/1968 |
| GB | 1 390 981 A | 4/1975 |
| GB | 1 491 501 A | 11/1977 |
| GB | 2 152 378 A | 8/1985 |
| GB | 2 230 004 A | 10/1990 |
| GB | 2 332 196 A | 6/1999 |
| GB | 2 370 242 | 6/2002 |
| GB | 2 445 465 A | 7/2008 |
| GB | 2 445 466 A | 7/2008 |
| GB | 2 445 467 A | 7/2008 |
| GB | 2 445 468 A | 7/2008 |
| GB | 2 448 390 A | 10/2008 |
| GB | 2 456 074 A | 7/2009 |
| JP | 7-313959 A | 12/1995 |
| WO | WO-82/01483 A1 | 5/1982 |
| WO | WO-99/04897 A1 | 2/1999 |
| WO | WO-03/024633 A1 | 3/2003 |
| WO | WO-03/025101 A2 | 3/2003 |
| WO | WO-2004/041733 A1 | 5/2004 |
| WO | WO-2006/056768 A2 | 6/2006 |

OTHER PUBLICATIONS

Written Opinion for International Application No. PCt/GB2005/004497, dated May 15, 2006.

* cited by examiner

AUTOCLAVE

CROSS-REFERENCE TO ELATED APPLICATION

The present application claims the benefit of priority of International Patent Application No. PCT/GB2005/004497 filed on Nov. 23, 2005, which application claims priority of Great Britain Patent Application Nos. GB0425684.8 filed Nov. 23, 2004; GB0425686.3 filed Nov. 23, 2004; and GB0503215.6 filed Feb. 16, 2005. The entire text of the priority application is incorporated herein by reference in its entirety.

FIELD OF THE DISCLOSURE

The present disclosure relates to a steam supply joint for an autoclave and an autoclave incorporating such a steam joint, particularly but not exclusively to provide an autoclave for treating waste.

BACKGROUND

It is known to process municipal and household waste, and also some commercial waste and industrial waste which can be included in municipal waste, by treating the waste material in an autoclave. The waste material is introduced into an autoclave which is a closed pressure vessel, and is subjected to saturated steam at an appropriate pressure and temperature, typically of at least 3 bar and above 130° C. By processing the waste material under these conditions for a sufficient period of time, the waste material is sterilized making it safe to handle. Advantageously, organic material within the waste material, such as fibers, plant matters, paper and the like is broken down to form a mass of small cellulose particles. During the processing, labels and printings on metal waste, glass and plastic bottles are removed and any plastic items such as bottles reduce in size. The resulting material can be easily sorted to remove recyclable items, the cellulose particles may be used in a variety of different applications, and the remaining fraction which is sent to landfill will be less than about 20% of the original mass of waste material. The process of treating waste material in an autoclave has thus many advantages.

Some disadvantages of the method are known. The supply of heated arid pressurized steam to the autoclave requires a great deal of energy particularly over a sustained period. Further, the autoclave itself is a large and consequently heavy piece of equipment: a typical autoclave able to take 20 tons of waste will be 20 meters long by 3 meters in diameter. The autoclave is typically pivotally mounted and is raised to receive material waste and lowered during the treatment process and to permit removal of the treated waste from the autoclave. This requires an appropriately powerful lifting mechanism which must be able to support the autoclave and resist substantial sideways forces as a result of the rotation of the autoclave.

Some further disadvantages of the present method is that where an autoclave is loaded and unloaded through a common opening to the autoclave, there is a risk of cross contamination between treated and untreated waste material. The loading process can also be time consuming, for example where a conveyor is used to transfer waste into the autoclave through the autoclave mouth.

SUMMARY OF THE DISCLOSURE

An aim of the disclosure is to reduce or overcome one or more of the above problems.

According to a first aspect of the disclosure, we provide that an autoclave may comprise a pressure vessel having a first mouth part to receive waste material and a second mouth part to discharge treated material, wherein the autoclave is rotatable at a longitudinal axis to agitate the waste material during treatment and to discharge waste material from the autoclave.

The first mouth part may be closeable by a first door and the second mouth part may be closeable by a second door.

The pressure vessel has a plurality of steam outlet pipes located within the pressure vessel and a steam Supply joint for supplying steam to the steam outlet pipes.

The doors may comprise a plurality of channels for connection to the steam outlet pipe to supply steam thereto.

A rotary steam joint is located on the door and is connectable to a steam supply source and to the pipes provided on the door.

The autoclave may be held at a fixed angle relative to the horizontal during the supply of waste treatment, the treatment of the waste material and discharge of the waste material.

The apparatus may comprise a loading apparatus for an autoclave, the loading apparatus comprising a waste holding part to receive waste, the waste holding part having an outlet receivable in an autoclave and a transfer apparatus to eject waste from the waste holding part through the outlet.

The outlet may comprise an end part of the waste holding part and the waste holding part may be moveable to locate the outlet in the autoclave.

The waste holding part may comprise a closeable vessel and the loading apparatus may comprise a packing device for compressing the waste.

The waste holding compartment may comprise a gate closeable to separate the outlet from the waste holding part to permit the waste to be compressed.

The packing device may comprise a piston moveable in the waste holding part.

The transfer apparatus may comprise a piston moveable in the waste holding part.

The transfer apparatus and the packing device may comprise the same piston.

The waste holding part may comprise a closeable inlet spaced from the outlet to receive for waste.

The loading apparatus may comprise a locating part to engage an end part of the autoclave.

The waste treatment apparatus may further-comprise a discharge conveyor to receive treated waste from the autoclave.

The autoclave may comprise a helix located within the pressure vessel, the helix having a first helix part relatively distant from the mouth and a second helix part relatively close to the mouth, wherein the second helix part has a smaller pitch than the first helix part.

The helix may be fixed to the pressure vessel.

The autoclave may further comprise a third helix part located alongside the second helix part and having a smaller pitch than the second helix part.

Alternatively, the pitch of the helix may vary continuously.

The helix may have a plurality of parts, each part having a fixed pitch.

The autoclave may be rotatable about its longitudinal axis in a first direction to receive waste material and in a second direction to discharge waste material.

The first door and the second door may be located at opposite ends of the pressure vessel on the longitudinal axis of the pressure vessel.

The steam supply joint may comprise a manifold joint for connection to the pressure vessel for rotation therewith and connectable to the plurality of steam outlet pipes within the autoclave a supply connection comprising a steam supply channel, and an outlet element connected to the supply connection to supply steam from the steam supply channel to the manifold, the outlet element and the manifold being operable to supply steam to a subset of the plurality of steam outlet pipes.

The manifold may have an inlet comprising a plurality of channels connectable to the plurality of steam outlet pipes, and wherein the outlet element at least one aperture to permit flow connection between the supply channel and at least one of the plurality of manifold channels.

The subset of the plurality of steam pipes may be located in a lower part of the autoclave.

The subset of the plurality of steam outlet pipes may be located in a lower section of the autoclave.

The steam supply joint may comprise a fixed support wherein the manifold is rotatable relative to the fixed support.

The supply connection and the outlet element may be rotatable relative to the fixed support.

The fixed support may comprise a stop element to limit rotation of the supply connection relative to the fixed support.

The steam supply joint may comprise an air vent channel extending from the outlet element to a vent wherein the outlet element has an aperture to connect the air vent channel to the manifold.

The manifold and outlet element may be arranged to connect the air vent channel to at least one steam outlet pipe in the upper part of the autoclave.

The air vent channel may comprise part of the supply connection.

A support sleeve may be connected to the manifold, wherein a part of the slide connection is received within the support sleeve and wherein a bearing is mounted between the support sleeve and the fixed support.

The support may have a steam inlet in flow connection with the steam supply channel.

The steam supply joint may be connected to the autoclave at one end thereof at the longitudinal axis.

The pressure vessel may be inclined at an angle of 2° to 100 to the horizontal.

The second mouth part may comprise a frusto-conical part, the frusto-conical part having a cone angle in the range 5° to 15°.

The apparatus may comprise drive means to rotate the autoclave about its longitudinal axis.

DESCRIPTION OF THE DRAWINGS

The disclosure will now be described way of example only with reference to the accompanying drawings, wherein.

DETAILED DESCRIPTION OF THE DISCLOSURE

Figure 1:
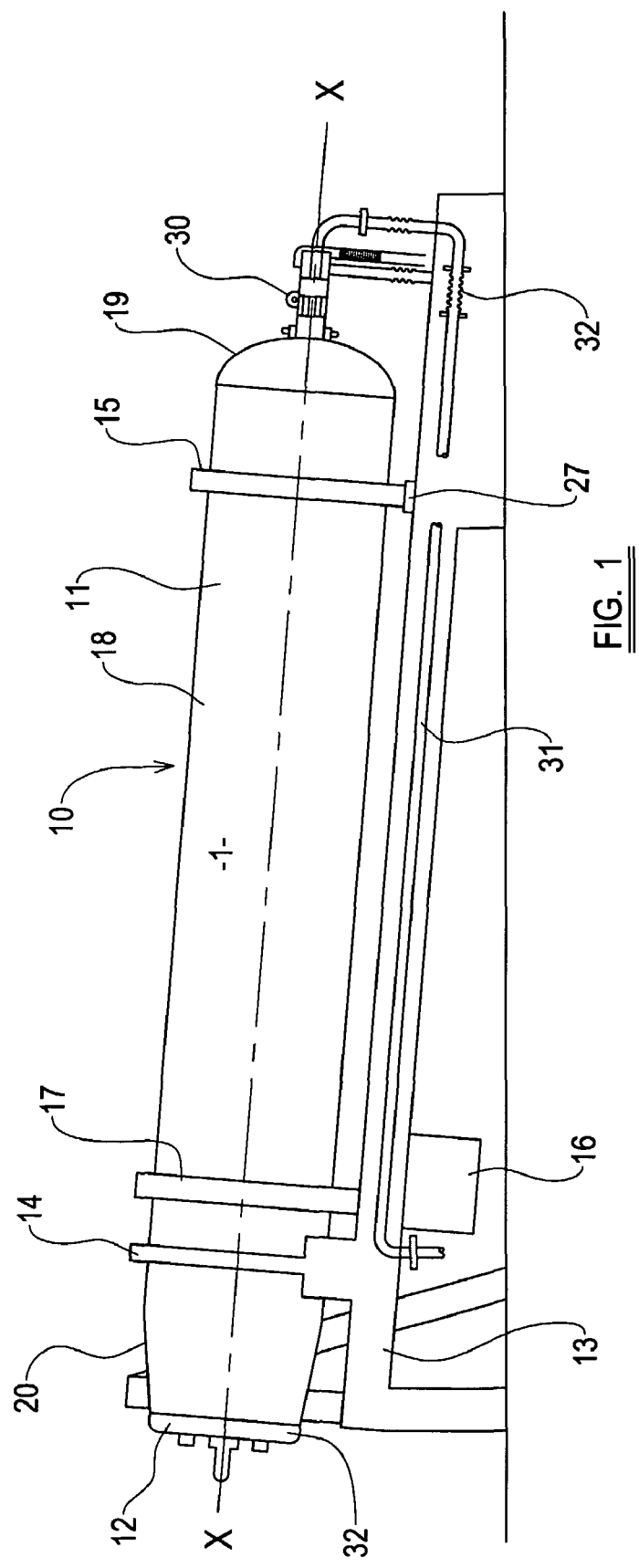
FIG. 1 is a side view of an autoclave embodying the present disclosure.

Referring now to FIG. 1, an autoclave is generally shown at 10 provided with a pressure vessel 11 closed at one end with a pressure tight door 12. The pressure vessel 11 is supported on an inclined bed plate 13, in this example inclined at an angle of 3° to 8° along its length, and is held in place on the bed plate 13 by appropriate supports 14. The pressure vessel 11 has a longitudinal axis generally illustrated by line X-X, and is rotatable about the axis in the supports 14 by a motor 16 acting on a driving part generally shown at 17. The pressure vessel 11 has a central generally cylindrical part 18 which extends over the majority of the length of the pressure vessel 11, an end part 19 at the opposite end of the pressure vessel 11 to the door 12, and a frusto-conical mouth part 20, the end of which is closed by the door 12.

To supply steam to the interior of the pressure vessel 11, a steam supply joint is shown generally indicated at 30, and will be discussed in more detail hereinafter. The steam supply joint 30 is connected by a pipe 31 to a source of steam (not shown). To accommodate a longitudinal expansion and contraction of the pressure vessel 11 as a result of heating and cooling, the steam supply joint assembly 30 is moveable relative to the bed plate 13 and is provided with an expansion joint 32 in the pipe 31 to accommodate internal movement.

Figure 2:
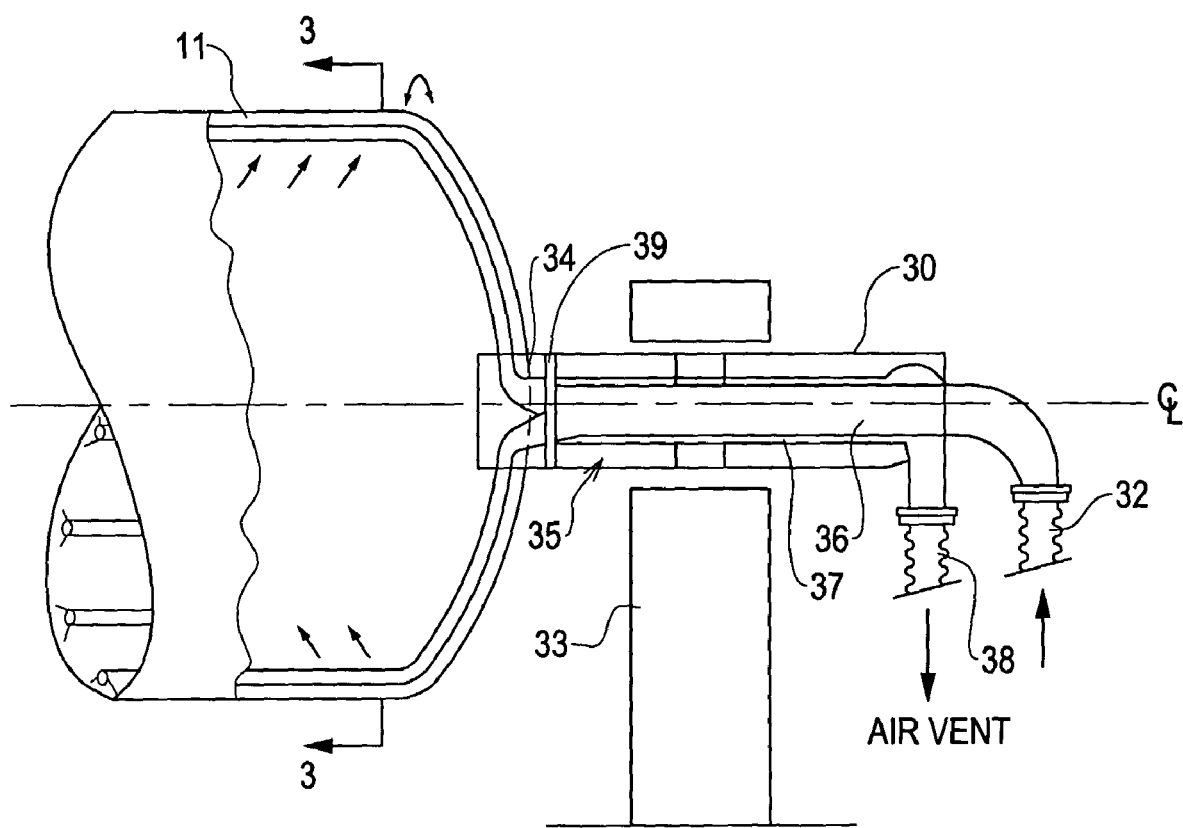
FIG. 2 is a diagrammatic view of a steam supply joint provided on the autoclave of FIG. 1.
Figure 3:
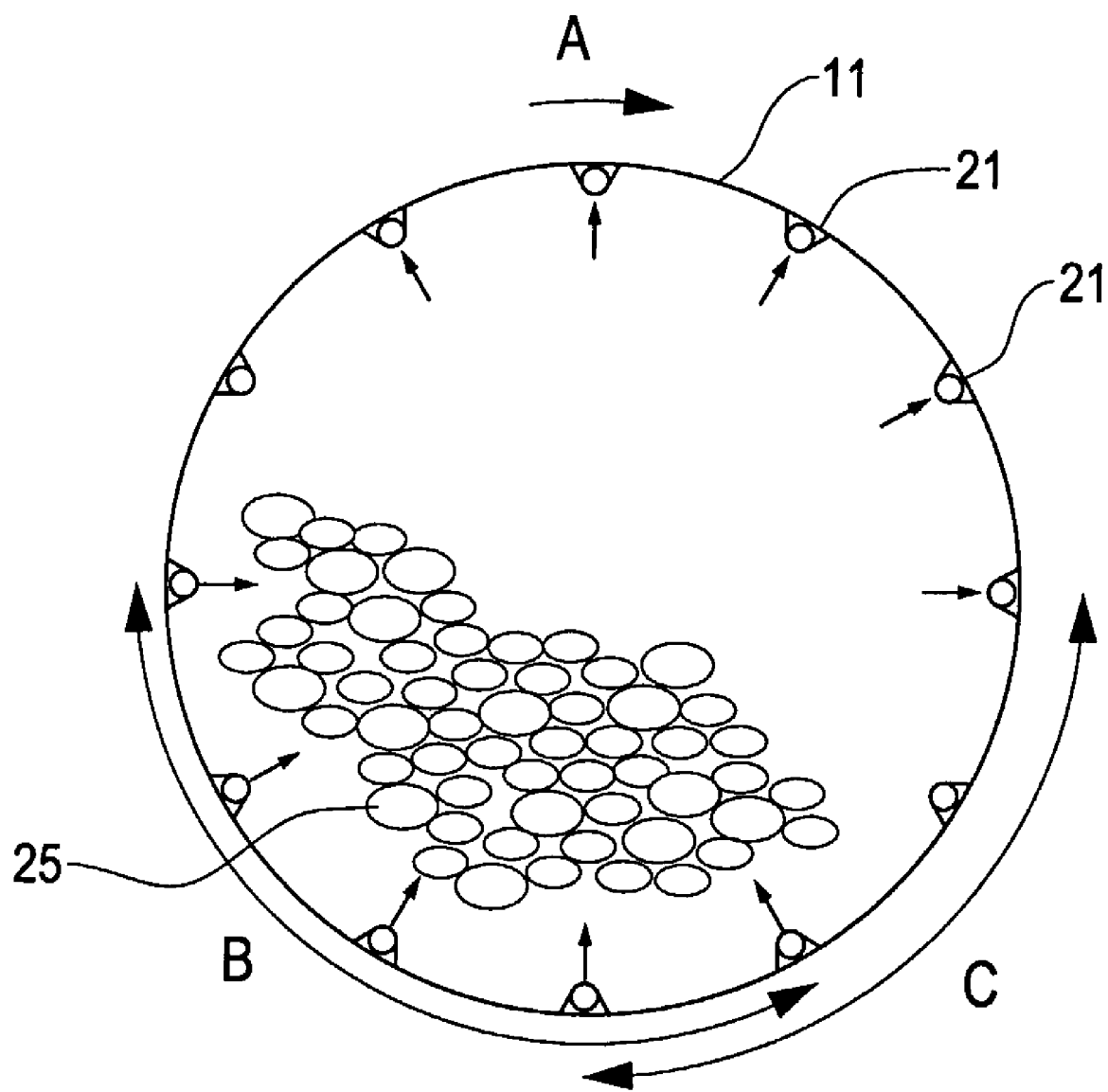
FIG. 3 is a section on line 3-3 of FIG. 2.
Figure 4:
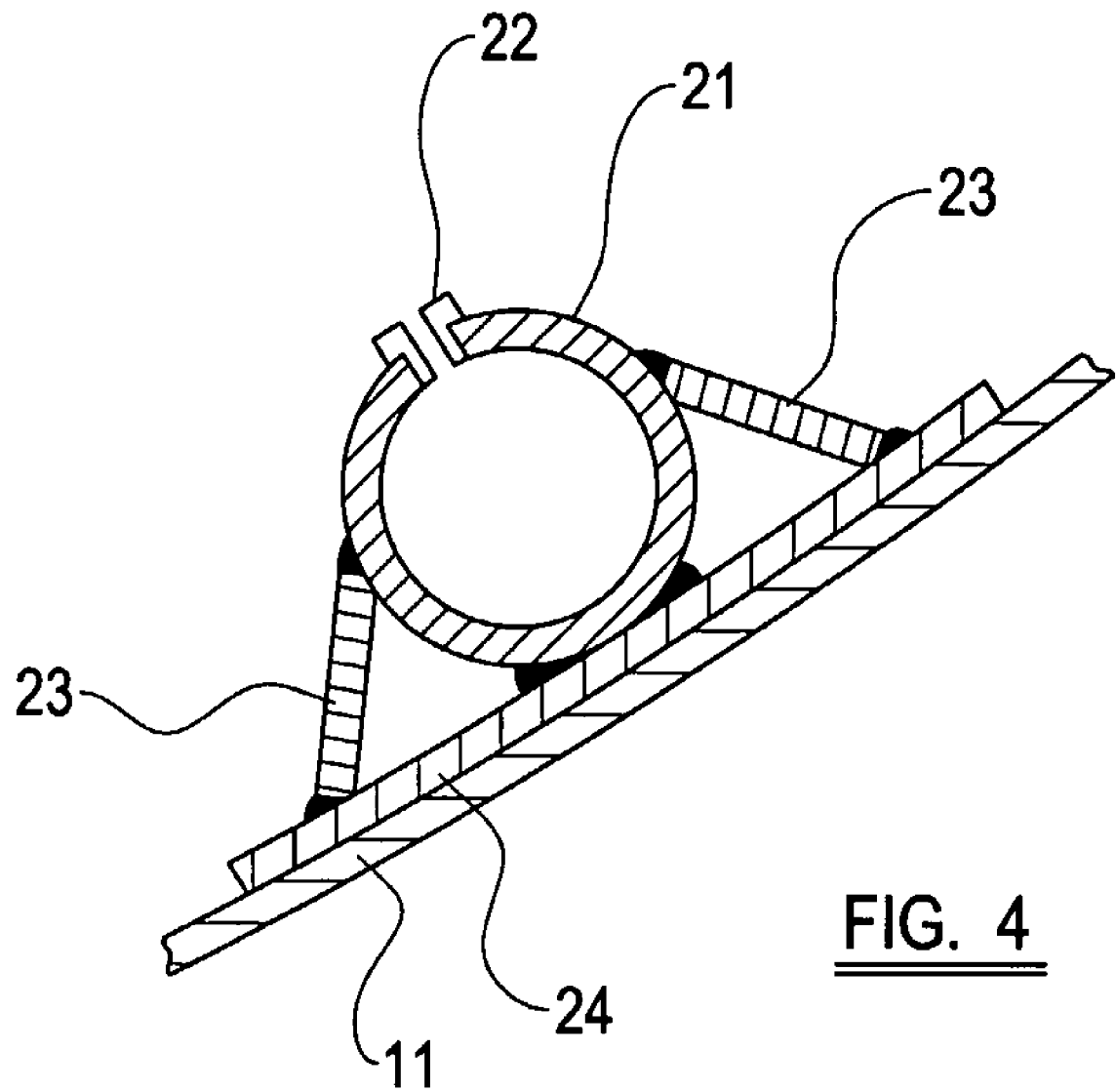
FIG. 4 is a view of part of FIG. 3 on a larger scale.

As shown in FIGS. 2 and 3, the interior of the pressure vessel 11 comprises a plurality of steam outlet pipes generally shown at 21, arranged at regular intervals around the interior of the pressure vessel 11. Each steam outlet pipe 21 is connected to the steam supply joint 30 as described hereinafter to supply steam to the interior of the pressure vessel 11. As shown in FIG. 4, each steam and outlet pipe 21 is provided at intervals on its length with nozzles 22 comprising inserts and is supported by welded side flanges 23 welded to a base plate 24 which is attached to the interior of the pressure vessel 11. The inserts 22 are of a hard material to reduce wear and are threaded to allow removal and replacement to adapt the nozzles to required operating conditions. The sacrificial base plate 24 allows the pipes 21 to be attached to and removed from the interior of the pressure vessel 11, for example for repair or replacement, without needing to work on the pressure vessel 11 itself, while the side flanges 23 allows each steam supply pipe 21 to act as a lifter to agitate, lift and drop the waste material within the pressure vessel 11 as it rotates.

As illustrated in FIG. 3, the rotation of the pressure vessel 11 in the direction A will cause the waste material within the pressure vessel 11 to fall in the lower part of the pressure vessel 11 and to one side of the pressure vessel. The steam joint 30 is operable such that steam is only supplied to the steam outlet pipes 21 in the lower part of the pressure vessel 11, and preferably to only those steam outlet pipes 21 disposed in the sector generally indicated at B where the waste material will fall. The steam supply joint 30 is provided with a steam supply pipe 32, a fixed support 33, a manifold 34 mounted on the pressure vessel 11 to rotate therewith and connectable to each of the steam outlet pipes 21, and a supply connection 35 which is connected to the steam supply pipe 32. The supply connection 35 comprises a steam supply channel 36 and an air supply channel 37 connected to an air vent 38, and has an outlet part 39 to connect the steam supply channel 36 and air vent channel 37 to the manifold 34. The air from the air vent 38 may be treated using ultraviolet light, to breakdown volatile organic compounds and remove odors from the air stream.

Figure 5:
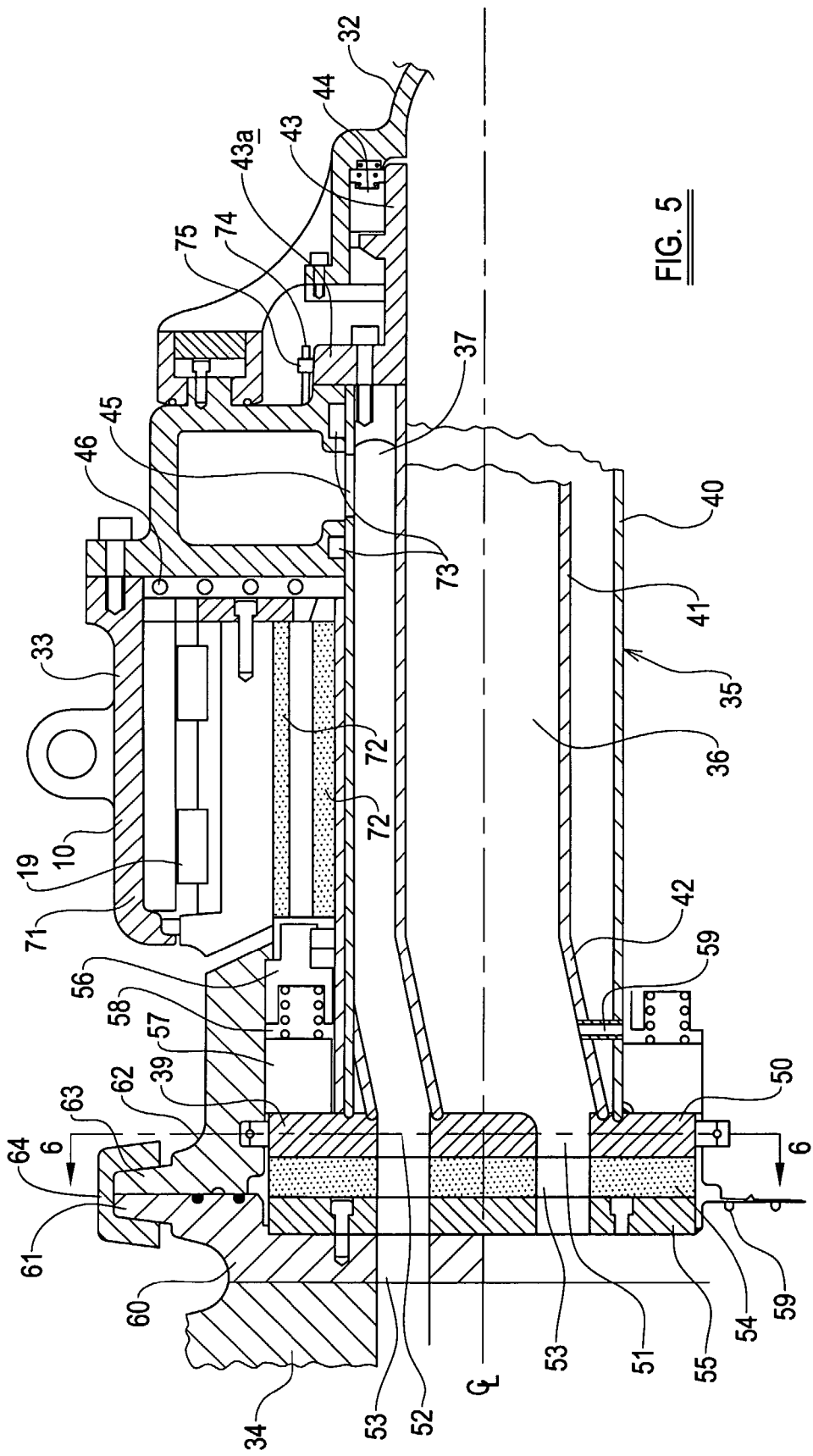
FIG. 5 is a partial cross section in greater detail of a steam supply joint embodying the present disclosure.

As best seen in FIG. 5, the supply connection 35 comprises exterior wall 40 and an inner wall 41 which are substantially co-axial except at an end point 42 where the interior wall 41 is offset in a direction towards the exterior wall 40. The air vent channel 37 is defined by the space between the interior wall 41 and exterior wall 40, whilst the steam supply channel 36 is defined by the interior of the inner wall 41. The inner wall 40 and outer wall 41 are connected at one end to an end section 43 which has a flange 43~, which closes the air vent channel 37. The end part 43 extends towards the steam supply pipe 32 and comprises a seal 44 located between the end part 43 and the fixed support 33. The outer wall 40 is provided with apertures 45 which connect the air vent channel 37 to an outlet chamber 46 connected to the air vent pipe 38.

Figure 6:
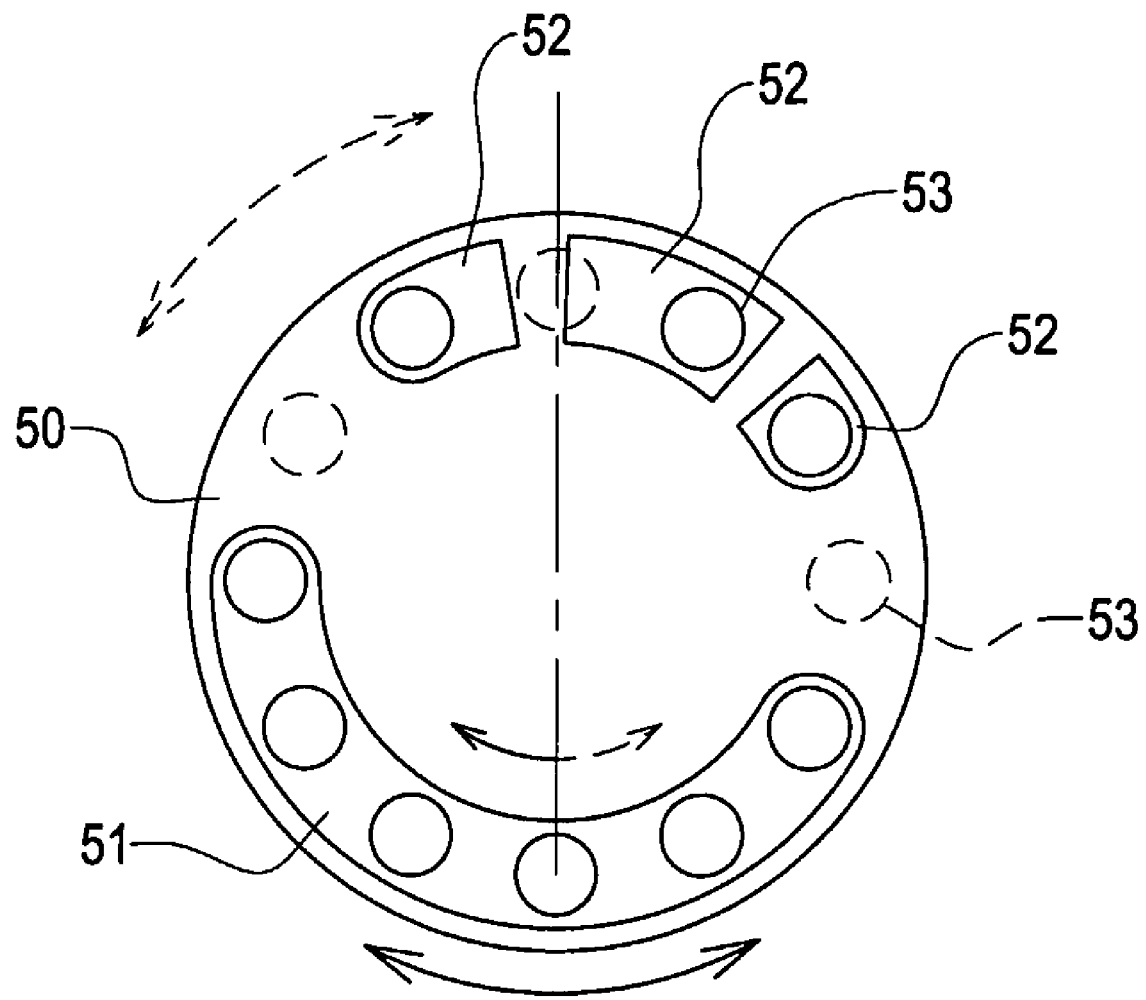
FIG. 6 is a partial section on line 6-6 of FIG. 5.

At the left hand end of the supply connector 35 as seen in FIG. 5, the supply connector 35 is connected to an outlet part 39, in this example comprising a hardened steel disc 50. The hardened steel disc 50, as illustrated in FIG. 6 comprises a first aperture of generally arcuate shape which is in flow connection with the steam supply channel 36. The outlet element 50 also comprises a plurality of air vent apertures 52 which are in flow communication with the air vent channel 37 of the supply connector 35. The manifold 34, as illustrated in FIG. 2, is connected to the steam outlet pipes 31 through a plurality of channels generally shown at 53. These channels are shown at 53 in FIG. 6 and it will be apparent that the effect of the outlet element 50 is to blank off some of the channels 53, connect some of the channels 53 via the steam supply aperture 51 to the steam supply channel 36, and connect a plurality of channels 53 through the air vent apertures 52 to the air vent channel 37. A carbon seal 54 is disposed between the outlet element 50 and a hardened steel face plate 55 of the manifold 34 to provide a sliding seal therebetween. To urge the outlet element 50, carbon seal 54 and front plate 55 into engagement, a piston 56 and carbon seal 57 are disposed gradually outwardly of the outer wall 40 adjacent the outlet element 50 and defining a volume 58 there between. A bleed channel 59 connects the steam supply channel 36 to the space 58, urging the seal 57 to the left and the piston 56 to the right as seen in FIG. 5, thus acting to urge the output element 50 into engagement with the seal 54, and the seal 54 into engagement with the front plate 55.

The manifold 34 further comprises a support plate 60 which has a flange 61 at an edge thereof. A support sleeve 62 is provided with a flange 63 at an end thereof. A clamp ring 64 clamps flanges 61, 63 together and so holds the support sleeve 62 in a fixed manner relative to the support plate 60. The fixed support 33 comprises a bearing support ring 70 and roller bearings 71 are located between the bearing support 70 and an end part of the support sleeve 62 to rotatably support the support sleeve 62. Part of the supply connection 35 is received within the support sleeve 62 and is rotatable relative thereto. A seal 72 is located between the support sleeve 62 and the outer wall 40 of the supply connection 35 to provide a sliding seal between the supply connection 35 and the support sleeve 62.

The supply connection 35 is thus rotatable relative to the fixed support 33, and seals 73 are provided to give a sliding seal between the fixed support 33 and the outer wall 4Q of the supply connection 35. To limit the range of movement of the supply connection 35 relative to the fixed support part 33, a stop element 74 is mounted on the fixed support 33 to engage a projecting part 75 on the supply connection 35, in this case provided on the flange 43. An appropriate number of stop elements 74 and projections 75 are provided with appropriate locations to provide the maximum desired range of rotation to the supply connection 35. This permits some lost motion movement of the supply connection 35.

The steam supply joint 30 thus operates as follows. When waste material has been placed in the pressure vessel 11 and the door 12 closed, steam is supplied from the steam supply pipe through the steam supply channel 36. Steam is supplied to the volume 58, thus acting on the seal 57 and piston 56 to urge the outlet element 50, seal 54 and face plate 55 of the manifold 34 into engagement. As the pressure vessel 11 rotates in direction A as shown in FIG. 3, the frictional engagement between the outlet element 50, seal 54 and base plate 55 will cause the supply connection 35 to rotate in the same direction until a projection 75 hits the stop element 74. The outlet aperture 51 of the connection element 54 will thus be rotated in a broadly clockwise direction as shown in FIGS. 3 and 6. As the pressure vessel rotates further, the manifold 34 will rotate with the pressure vessel 11, and so the channels 53 of the manifold 34 will be rotated into and out of flow communication with the steam supply channel 36 via the aperture 51. Thus, the steam will only be supplied to the steam outlet pipes 21 in the sector B as shown in FIG. 3, thus only supplying steam where it passes through the waste material 25 and not injecting steam into the volume above the waste material 25. As steam is only supplied where it can pass through the waste material 25, optimizing heat transfer to the material within the pressure vessel 11, the use of steam by the autoclave 10 is much more efficient and the energy requirements are reduced accordingly. If the direction of the rotation of the pressure vessel 11 is rotated in the opposite direction, the frictional engagement between the outlet element 50, seal 54 and base plate 55 will rotate the supply connector 35 in the opposite direction until a projection 75 engages the appropriate stop element 74, thus only supplying steam to those steam outlet pipes 21 in the sector C as shown in FIG. 3. The lost motion mechanism of the steam supply joint thus ensure that steam is supplied to the appropriate sector of the pressure vessel 11 regardless of the direction of rotation of the pressure vessel. The steam outlet pipes 21 in the upper part of the pressure vessel are connected to the air vent channel 37 via the air vent apertures 32 in the outlet element 50, and thus there is always an appropriate air vent connection from the interior of the pressure vessel 11 as necessary.

It will be apparent that where the pressure vessel 11 only rotates in one direction, then the supply connection 35 need not be rotatable relative to the fixed support 33, but may be fixed such that it only supplies the appropriate sector B or C for the given direction of the rotation of the pressure vessel 11.

Figure 8:
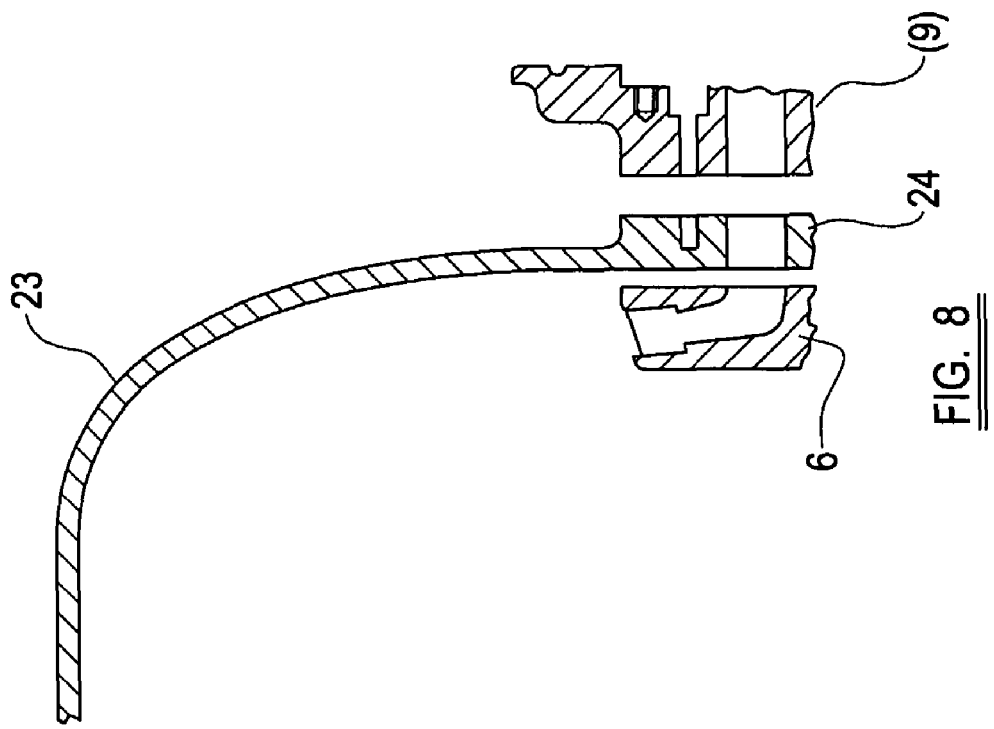
FIG. 8 is an alternative configuration of the view of FIG. 7.
Figure 7:
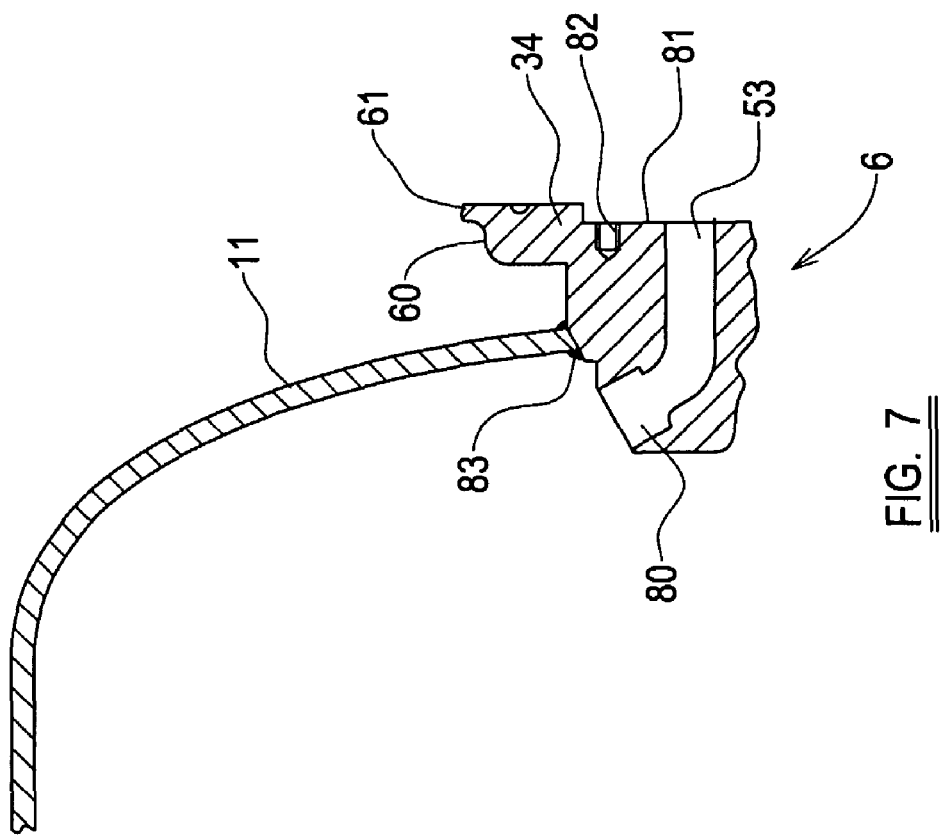
FIG. 7 is a section through a part of the steam supply joint of FIG. 5.

A part of the manifold is shown in more detail in FIG. 7, where the channel 53 is shown passing through the manifold 34 and has an outlet connection 80 at one end to connect to a steam outlet pipe 21. The manifold shown at 57 has a recess 81 in its front phase to receive the front plate 55 and a threaded bolt hole 82 to receive an appropriate bolt. The manifold 34 is welded to the pressure vessel 11 as shown in 83. In FIG. 7, the manifold 34 is shown integrally provided, with the exception of the base plate 55. It will be apparent that the manifold may alternatively be provided in a variety of sections as shown in FIG. 8 and assembled by any appropriate means as desired.

It will be apparent that the steam joint 30 may be used in other applications, and not merely to supply steam to an autoclave as desired herein.

Figure 9:
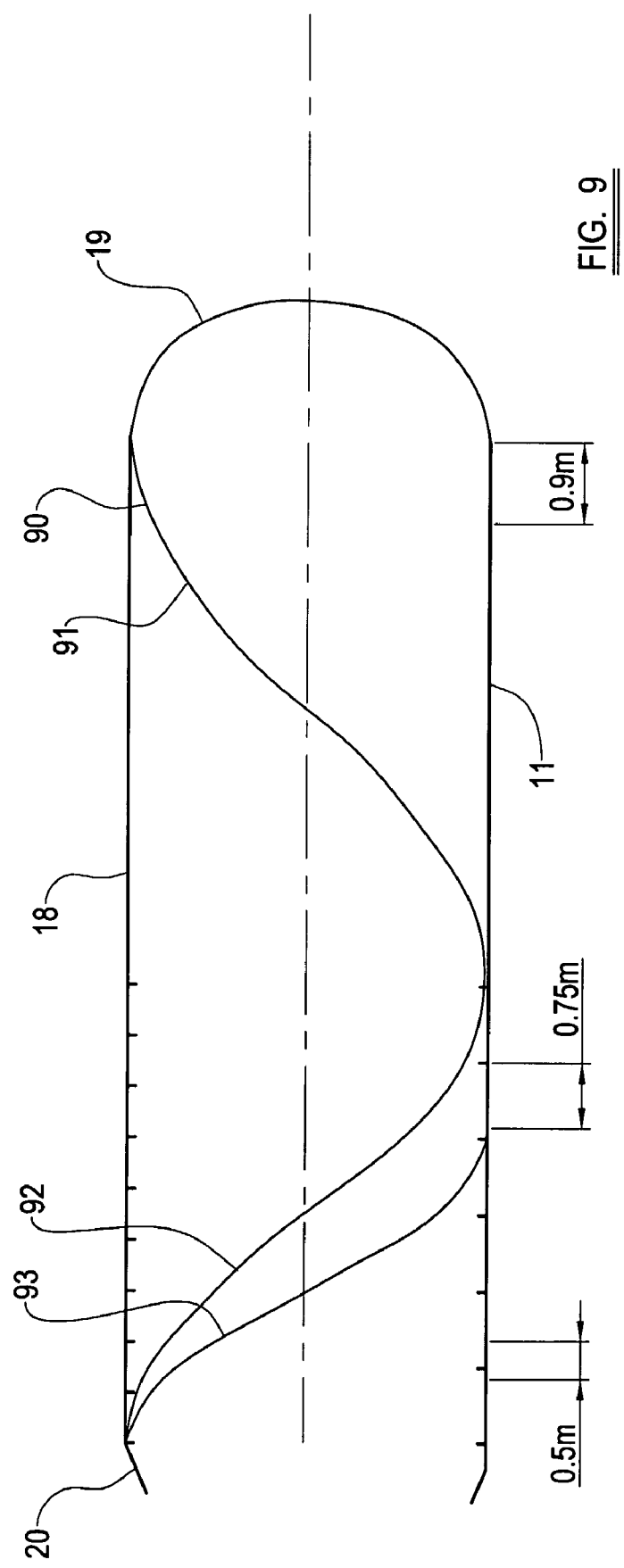
FIG. 9 is an illustration of the interior of the autoclave of FIG. 1.
Figure 10:
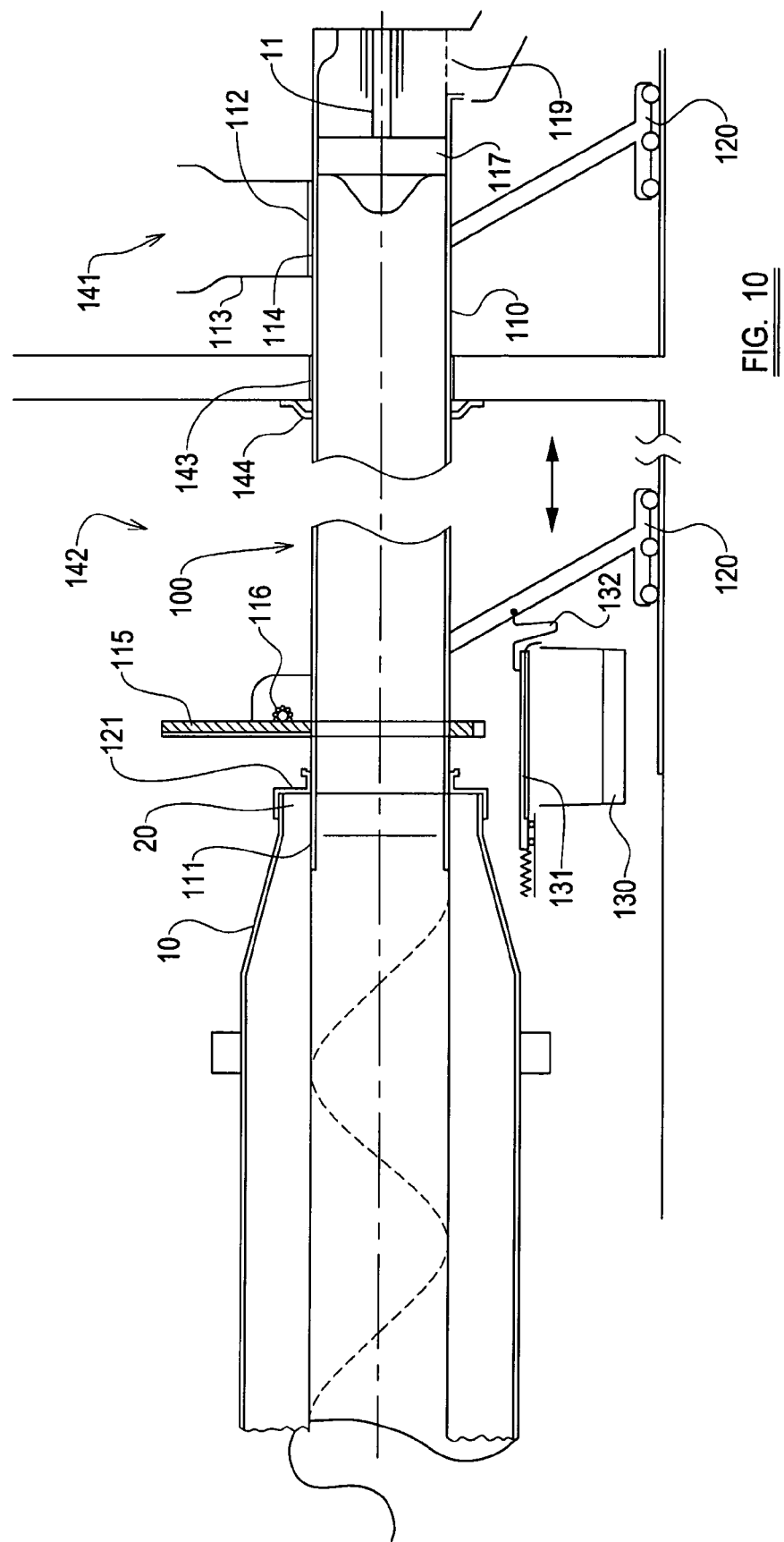
FIG. 10 is a diagrammatic view of a loading apparatus.

To allow the autoclave 10 to be loaded and unloaded without having to lift the pressure vessel 11, an internal helix structure 90 projecting from the interior of the pressure vessel 11 is provided. This helix structure 90 may be provided by one of the supply pipes 21, or may be a separate structure in itself. With reference to FIGS. 9 and 10, the pressure vessel is shown generally at 11, with the cylindrical body, end section and frust-conical mouth part illustrated at 18, 19 and 20 respectively. The helix structure is shown at 90 extending around the interior of the cylindrical body 18. In this example, the helix structure 90 extends all the way up the frusto-conical mouth part 20.

To be able to unload the treated waste material from the interior of the pressure vessel 11 without tilting the pressure vessel 11, it is necessary that the helix structure 90 provides an appropriate driving force towards the mouth of the pressure vessel 11, and in particular to urge the waste material up the slope of the frusto-conical end part 20. To achieve this, the helix structure 90 comprises a plurality of helix parts 91, 92, 93 of progressively smaller pitch. The pitch of the helix in this case refers to the longitudinal distance of the pressure vessel 11 that it would take the helix part to perform a complete rotation.

It will be apparent that the shortening pitch of the helix structure 90 may be achieved by any appropriate configuration, such as a consistently decreasing pitch over the length of the pressure vessel 11 or, as in the present example, having successive of the helix parts where each helix part is of a consistent pitch. Similarly, the helix structure 90 may have only a single part in each length of the pressure vessel 11, or, as in the present example, two helix parts 92, 93 may extend along the same part of the pressure vessel 11 such that at least part of the length of the pressure vessel 11 has two or more helix parts. In the example shown in FIG. 9, the cylindrical middle part 18 has an overall length of about 10 meters. The first helix part 91 has a pitch of about 10.8 meters, and so the half rotation shown here extends for about 5.4 meters of the length of the middle part 18. The second helix part 92 has a pitch of about 9 meters, and again this example performs a half turn extending along about 4.5 meters of the middle section 18. The third helix part 93 has a pitch of about 6 meters and in this example extends alongside the second helix part 92 and completes a half turn extending over a length of about 3 meters into the frusto-conical mouth part 20.

The angle of the frusto-conical mouth part 20 may be of any appropriate angle, but it has preferably a relatively small inward slope of around 5° to 15°. As the pressure vessel 11 is inclined at an angle in the range of 2° to 10°, the helix structure must drive the treated waste material up the internal slope of the frusto-conical end part 20 at an angle to the horizontal in the range 7° to 25°. The increasing pitch of the helix structure 90 and the co-extending helix parts 91, 92 towards the frusto-conical end part 20 act to provide suitable sufficient driving force to drive the waste material out of the mouth 20 by rotation of the pressure vessel 11 alone. This thus removes the need to provide the autoclave 10 with lifting apparatus to lift the pressure vessel 11 and thus greatly reduces the engineering and material requirements of the autoclave 10.

Although the autoclave 10 may be loaded with any appropriate loading apparatus as required, an example of a loading apparatus is shown in FIGS. 10 to 14. With reference to FIGS. 10 to 14, a loading apparatus is generally shown at 100 for introducing waste material for treatment into the autoclave 10. The loading apparatus 100 comprises a waste holding part 110 to receive waste, in the present example comprising a generally cylindrical vessel. The waste holding part has an outlet 111 which is receivable in the mouth part 20 of the autoclave 10. The outlet 111 in the present example comprises an end part of the waste holding part 110, although any other appropriate outlet shape or configuration might be provided, as an attachment to the waste holding part 110 or otherwise. The waste holding part 110 has an inlet 112 to receive waste loaded into a receiving hopper 113 and closeable with a door 114. The inlet 112 is located at the end of the waste holding part 110 distant from the outlet 111. To close the open end of the waste holding part 110 and separate it from the outlet part 111, a gate 115 is provided moveable between an open and a closed position by a mechanism generally shown at 116. In this example, the gate 115 is shown as a vertically moveable barrier which is moveable downwardly to close the waste holding part 110, but any other gate mechanism may be provided as appropriate.

At the end of the waste holding part 110 opposite the outlet 111, a piston 117 is provided moveable within the waste holding part 110 and driven by a pneumatic or hydraulic cylinder 118. As discussed in more detail below, the piston 117 acts both as a packing device, to compress waste within the waste holding part 110, and also acts as a transfer apparatus to eject waste from the waste holding part 110 through the outlet 111. A piston bypass opening 119 allows the escape of fluid from the waste holding part 110 and the clearing of material from behind the piston 117 if needed.

As generally illustrated at 120, the waste holding part 110 is supported on appropriate moveable supports to permit longitudinal movement of the waste holding part 110 between a loading position, where the outlet 111 is received in the autoclave 10, and a withdrawn position where the outlet 111 is withdrawn from the autoclave 10. A locating part 121 is provided mounted on the outlet 111 to engage the edge of the mouth part 20 of the autoclave 10 and to ensure that the outlet 111 is correctly received and aligned within the autoclave 10.

A discharge apparatus comprising a discharge conveyor 130 is located below the mouth 20 of the autoclave 10 to receive waste expelled from the autoclave 10 by rotating the autoclave 10 in an appropriate direction. To prevent contamination of the discharge conveyor 130 and the treated waste handling system in general with untreated waste during movement of the waste handling part 110, a cover 131 is provided located over the discharge conveyor 130 when the waste handling part 110 is in the loading position. The cover 131 is moveable to uncover the discharge conveyor 130 when the outlet 111 is withdrawn from the autoclave 10, whether by a direct connection between the loading apparatus 100 and the cover 131 as illustrated at 132, or otherwise. In FIG. 10, the waste treatment apparatus is generally shown as being provided with a firewall 140 which separates a waste reception area generally shown at 141 and a waste treatment area generally illustrated at 142. The waste holding part 110 passes through an appropriate hole 143 in the firewall 140 and a fire sealing element 144 surrounds the waste holding part 110 to seal the space between the waste holding part 110 and the edge of the hole 143.

Figure 11:
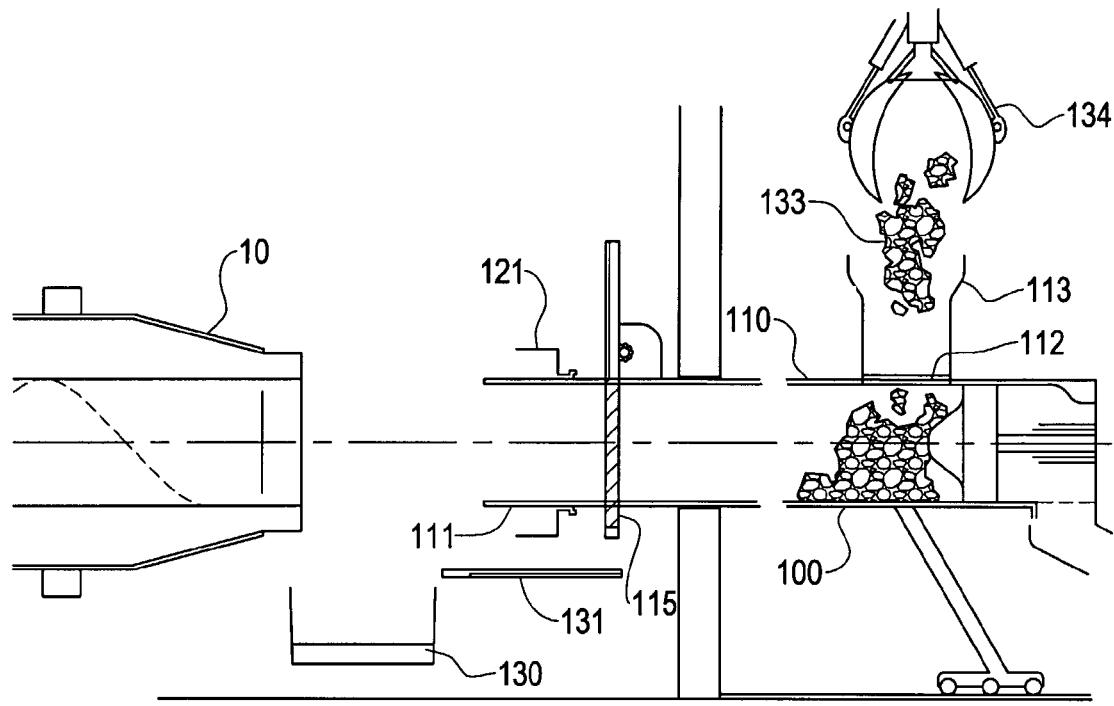
FIG. 11 is a diagrammatic view of the loading apparatus of FIG. 10 in a first stage of operation.
Figure 12:
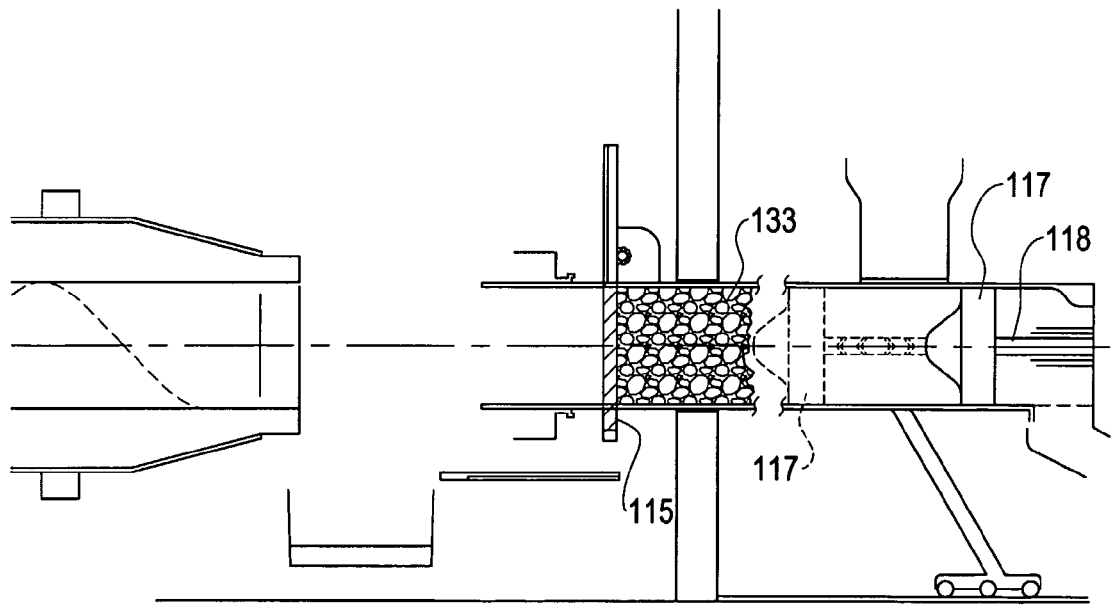
FIG. 12 is a diagrammatic view of the loading apparatus of FIG. 10 in a second stage of operation.

The operation of the loading apparatus 100 will now be described with reference to FIGS. 11 to 14. In a first stage of the operation, the waste holding part 110 is in its withdrawn position, such that the outlet 110 is withdrawn from the autoclave 10 and the gate 115 is in its closed position to separate the withholding part 110 from the outlet 111. The cover 131 is withdrawn from the discharge conveyor 130 so that the autoclave may at this stage be discharging waste from a previous treatment cycle while the next load of waste to be treated is prepared using the loading apparatus 110. The inlet 112 is open and waste generally shown at 133 is lowered into the hopper 113 by an appropriate loading device 134. The waste 133 falls through the hopper 113 and inlet 112 into the waste holding part 110. As shown in FIG. 12, when sufficient waste has been introduced into the waste holding part 110, the cylinder 118 is operated to move the piston 117 to the left as shown in FIG. 12 to compress the waste material 133 against the gate 115. The piston 117 is then withdrawn to the right to permit additional waste to be introduced as shown in FIG. 11, and the packing process as shown in FIG. 12 is then performed again.

Figure 13:
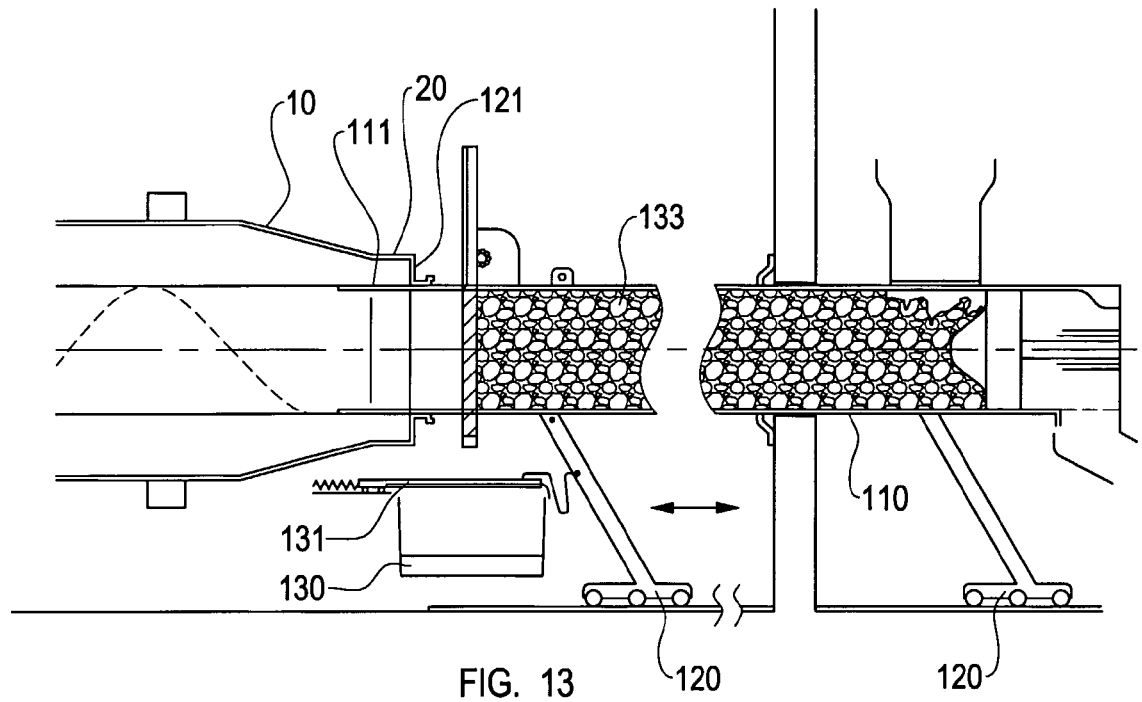
FIG. 13 is a diagrammatic view of the loading apparatus of FIG. 10 in a third stage of operation.
Figure 14:
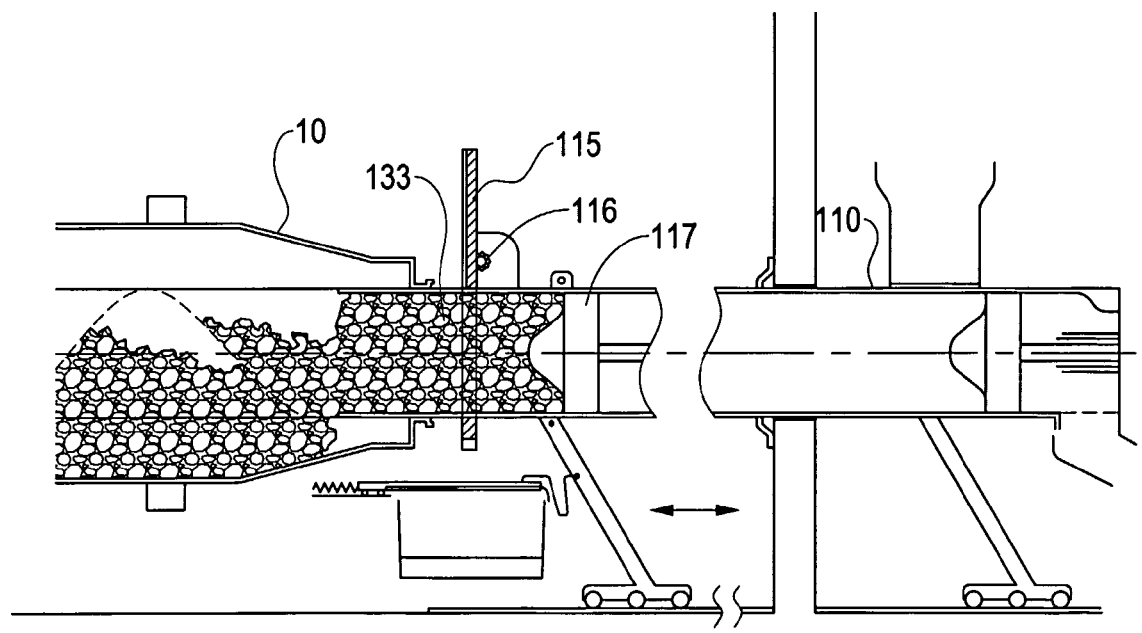
FIG. 14 is a diagrammatic view of the loading apparatus of FIG. 10 in a fourth stage of operation.

When sufficient waste to constitute a full load for the autoclave 10 has been introduced into the waste holding part 110 and compressed by the piston 117, the inlet 112 is then closed. The loading apparatus 100 may include, for example, a weighing device to measure the weight of material held in the waste holding part and indicate when a full load has been reached, or any other indication may be used as desired. As shown in FIG. 13 when a full load has been assembled, the waste holding part 110 is moved longitudinally on its supports 120 to the left as shown in FIG. 13 until the outlet 111 is received in the mouth 20 of the autoclave 10. The cover 131 moves to cover the discharge conveyor 130. The locating part 121 engages the outside of the mouth part 120 of the autoclave 10 to correctly locate and position the outlet 111, and also to close the mouth 20 of the autoclave 10. As shown in FIG. 14, the gate 115 is then lifted by the drive mechanism 116 and the piston 117 moves to the left to urge the waste to the left and eject it through the outlet 111 into the autoclave 10. As discussed above, the autoclave 10 may be rotated in an appropriate direction during this loading phase to distribute the waste material within the autoclave 10. The piston 117 has a sufficient stroke to eject all of the waste 133 from the waste holding part 110.

When the waste has been ejected, the gate 115 is closed and the waste holding part 110 is moved to the right to its withdrawn position to begin the loading process again. In the meantime, the autoclave 10 is closed by closing the mouth with the autoclave door, for example as discussed herein before, and the waste within the autoclave 10 is then treated. When the waste treatment is complete, the discharging and loading cycle is repeated.

The loading apparatus as described herein allows faster loading of the autoclave 10 than conventional conveyor systems as a complete load is assembled in advance, and may be assembled while the autoclave 10 is treating a previous load of waste. When the autoclave 10 is ready to receive the new load of untreated waste, the loading apparatus can transfer the entire load to the autoclave in a single relatively quick operation. Because the waste is held in a waste holding part which is a closed vessel, the end gate of which is only open for transfer of the waste when the outlet part 111 is received within the autoclave 10, the possibility of untreated waste spilling or falling out and contaminating the treated waste discharge and handling apparatus is considerably reduced. The longitudinal movement of the waste holding part 110 allows operation of the loading apparatus 100 through a fire wall thus permitting the waste receiving and treatment parts of the waste handling apparatus to be separated with a consequent reduction in fire risk and contamination risk. The outlet 111 is further designed to fit into the mouth of the autoclave without coming into contact with the helixes of the autoclave, so that that autoclave 10 can be rotated during loading.

Although in the present example, the autoclave 10 includes both the pressure vessel 11 with the helix structure 90 and steam joint 30 to provide an advantageous combination, it will be apparent that the autoclave 10 may be provided with any other steam supply joint as appropriate, for example through the door 12 in known manner, and equally the steam supply joint 30 may be used on any other type of autoclave, including autoclaves that are pivotally lifted and lowered to receive waste material and remove the treated waste material.

The autoclave 10 may further be provided with a door at each end if desired. Where a door is located at each end, untreated waste material may be loaded through one door and treated waste removed through the other. This permits the separation of treated and untreated waste and helps ensure the sterility of the treated waste.

Figure 15:
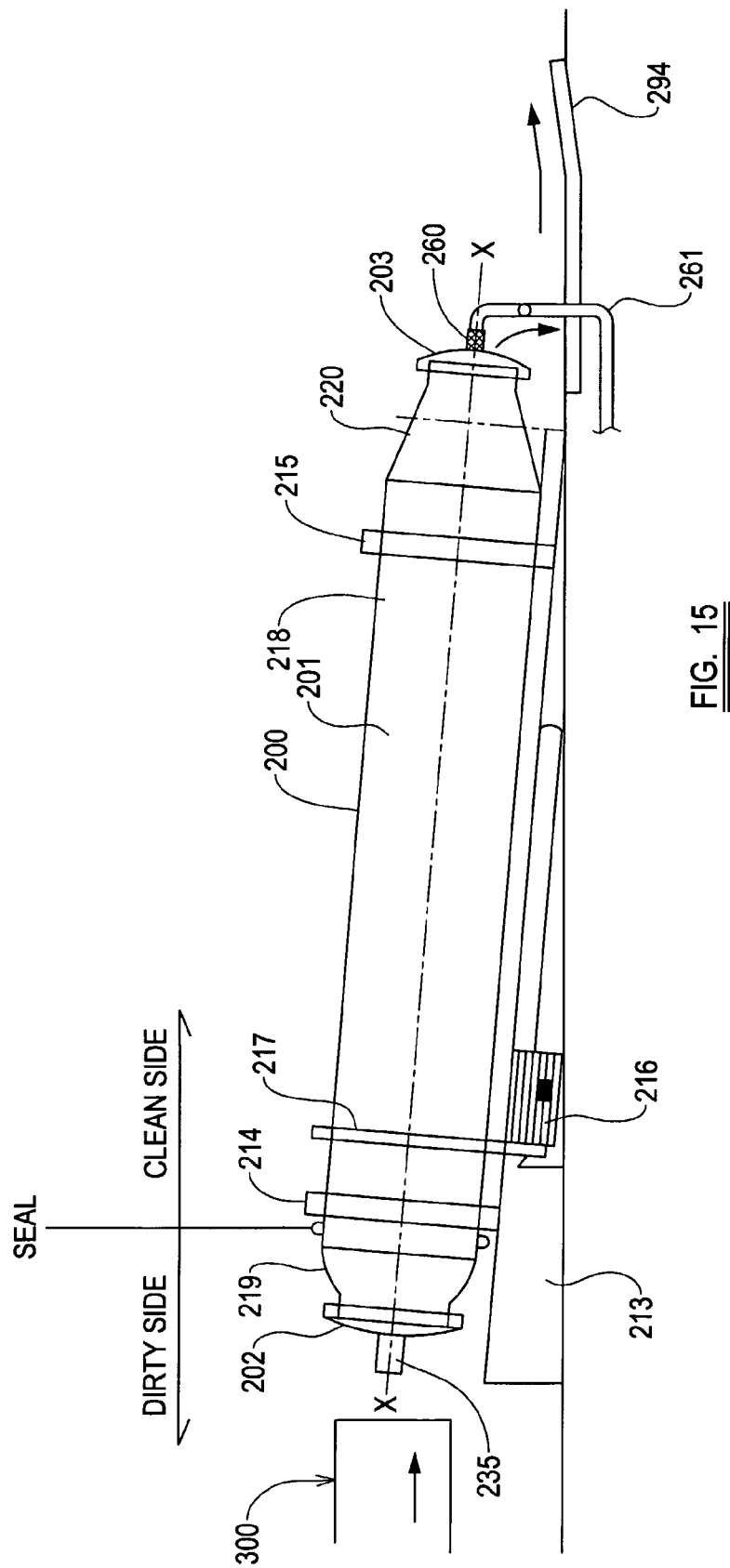
FIG. 15 is a diagrammatic view of a further autoclave embodying the present disclosure.

An autoclave having a door at each end is shown in more detail in FIG. 15 onwards. An autoclave is shown at 200 having a pressure vessel 201. In the similar manner to the autoclave of FIGS. 1 to 14, the pressure vessel 201 comprises a cylindrical body 218, end section 219 having a first mouth part and frusto-conical end part 220 having a second mouth part. The pressure vessel 201, in like manner to the pressure vessel of FIGS. 1 to 14, is disposed with its longitudinal axis X-X inclined at an angle, in the present example in the range of 2 degrees to 10 degrees, but in this embodiment the autoclave is oriented such that the frusto-conical end part 220 is located at the downwardly directed end of the pressure vessel 201, in the opposite configuration to the arrangement of the autoclave 10 of FIGS. 1 to 14. The first mouth part is closed with a first pressure tight door 212 and at the other end the second mouth part is closed with a second pressure tight door 213.

In a similar fashion to the autoclave of FIGS. 1 to 14, the autoclave 200 is located on a bed plate 213 and is supported thereon by appropriate supports 214, 215. The autoclave is rotatable about its longitudinal axis X-X by a motor 216 acting on a driving mechanism generally shown at 217.

Figure 16:
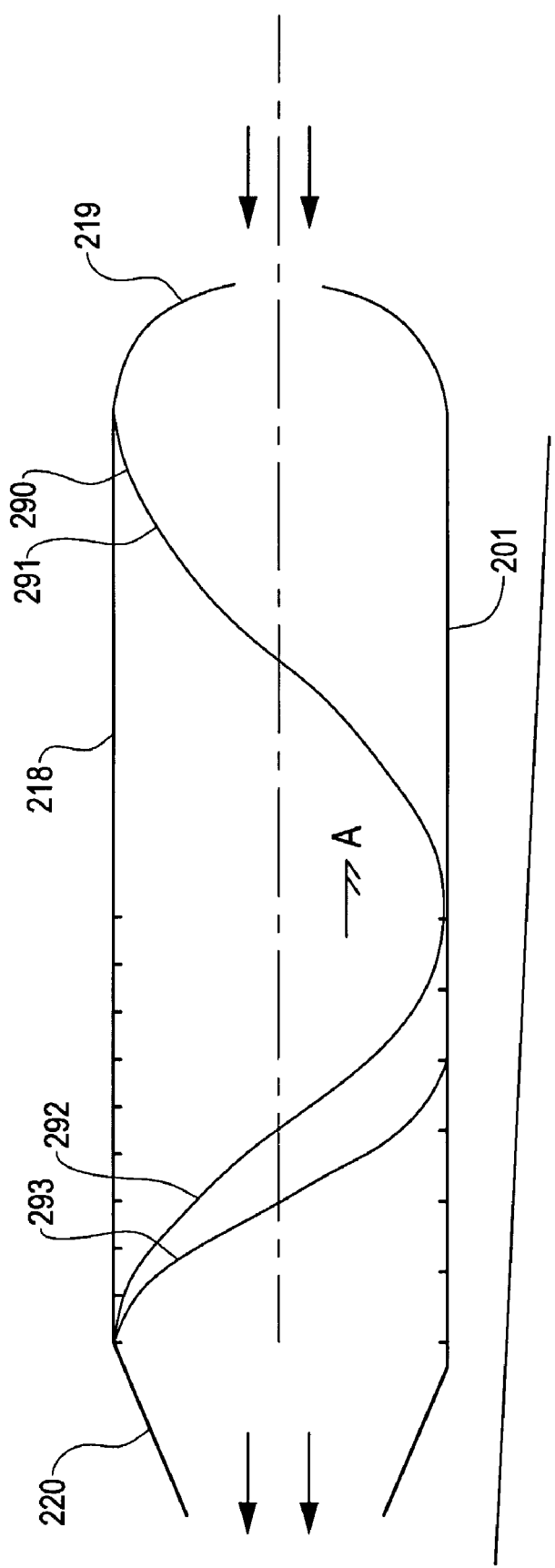
FIG. 16 is an illustration of the interior of the autoclave of FIG. 15.

As shown in FIG. 16, the pressure vessel 201 is similarly provided with an internal helix structure 290 projected from the interior of the pressure vessel. In this example, the helix structure 290 is provided with a plurality of helix parts 291, 292, 293 of progressively smaller pitch in like manner to the helix structure shown in FIG. 9. The helix structure may alternatively have any number of helix parts, pitches or otherwise as desired. Preferably, each helix part comprises a suitably configured sparge pipe of similar design to that shown at 21 in FIG. 4, although of course the helix structure 290 may be provided separately from any sparge pipes as desired.

Figure 17:
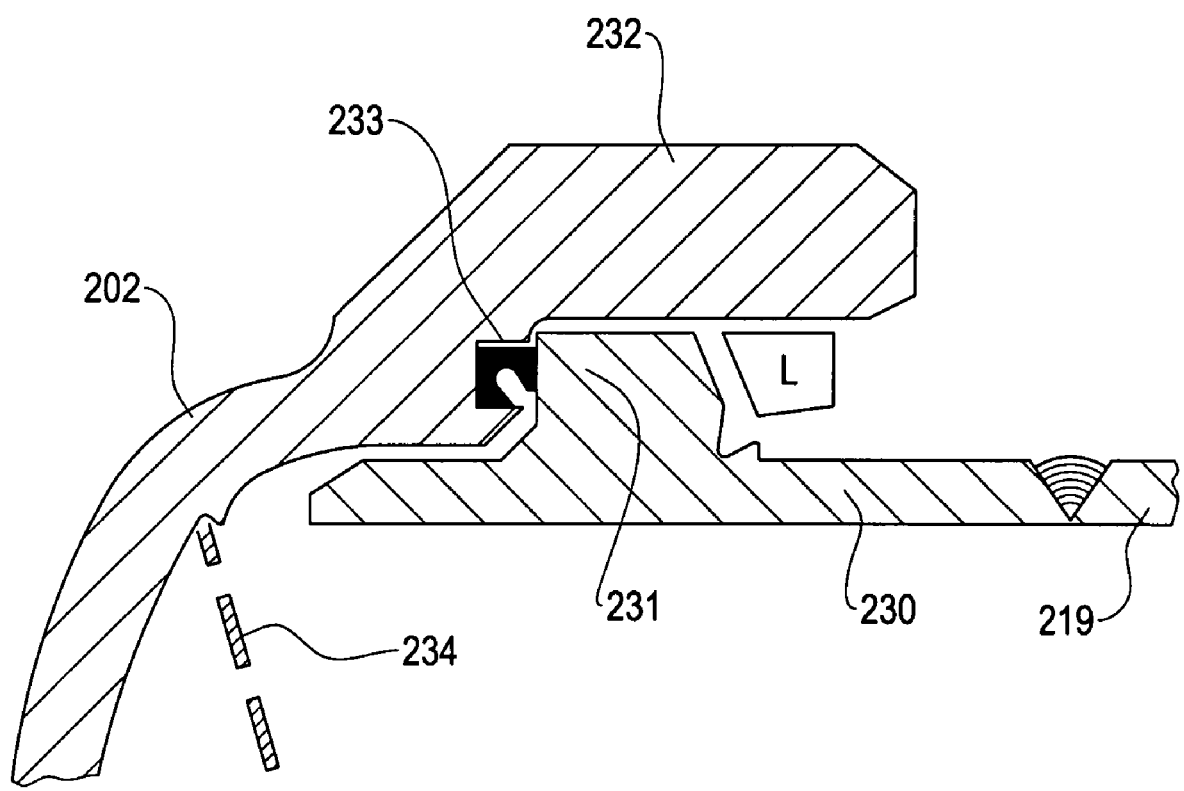
FIG. 17 is a parcel section through a door of the autoclave of FIG. 15.

The structure of the door 202 is shown in more detail in FIG. 17. The end part 219 is provided with a neck section 230 which has an annually extending flange 231. An out of skirt 232 of the door 202 extends alongside the flange 231 and a seal 233 is held between the door 202 and flange 231. A mesh guard 234 is located on the inner surface of the door 202 and protects rotating joint 235 from interacting with the material within the autoclave 201. The neck 230 in this example comprises a forged element which is attached to the end part 219 by a weld generally shown at 236, but it may be provided integrally or otherwise as desired. The door 203 is held in place by a locking system generally shown at L, which engages the flange 231 in this example.

Figure 18:
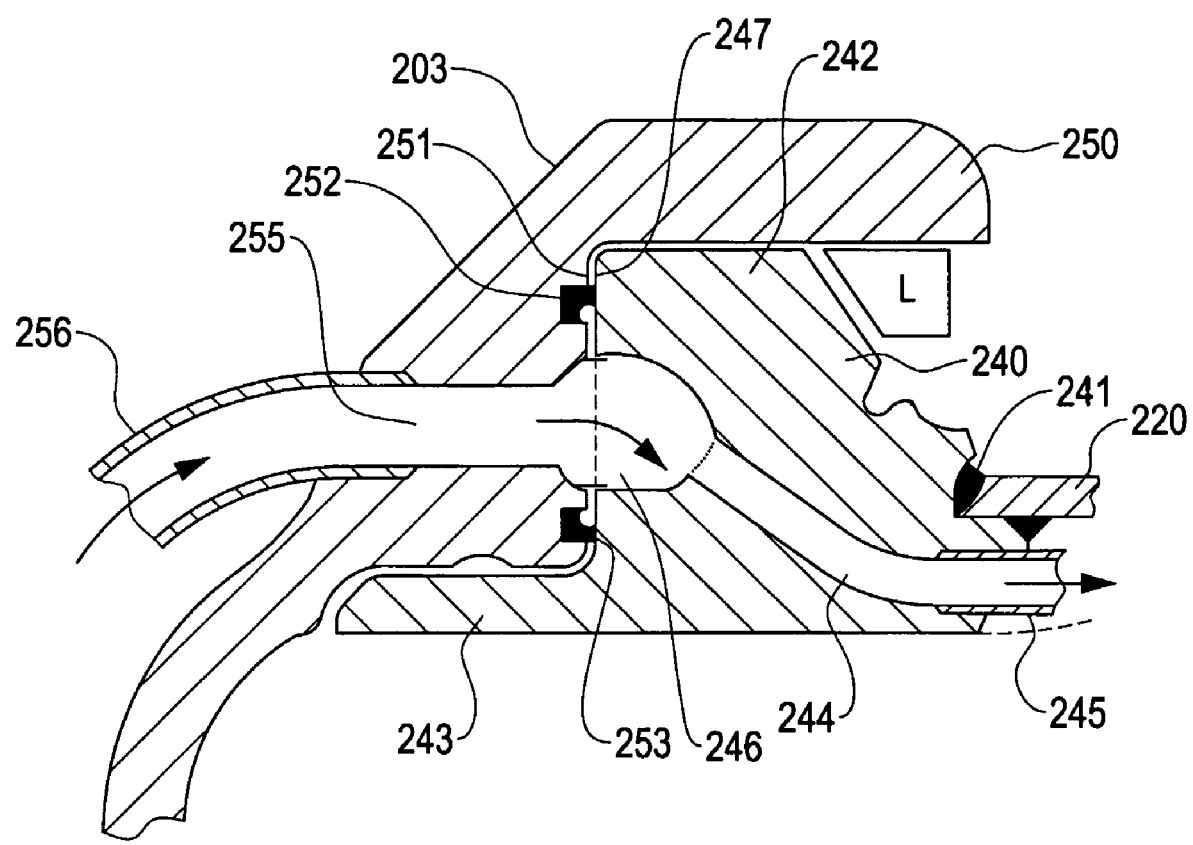
FIG. 18 is a partial section through another door of the autoclave of FIG. 15.

Door 203 is shown in partial section in FIG. 18 in more detail. In this example, the frusto-conical end part 220 is provided with a steam connection collar generally shown at 240. The steam connection collar 240 is attached to the frusto-conical mouth part 220 by a weld 241 and provides an outwardly extending flange 242 and a generally cylindrical inner part 243. The collar 242 has a plurality of channels 244 passing there through for connection to a plurality of steam outlet pipes or sparge pipes as illustrated here at 245. Each channel 244 connects to an annular gallery 246 which opens on an end surface 247 of the collar 242.

The door 203 has a generally cylindrical outer part 250 which extends around the edge of the collar 242. A closure face 251 of the door 203 is located to abut the surface 247 of the collar 242 and trap seals 252, 253 therebetween. The door 203 has channels 255 located therein to which are attached pipes 256 leading to a steam joint on a centre line of the door 203. The door 203 and collar 242 are providing with locating elements (not shown) such that the door 103 engages the collar 242 in such a position that each pipe 255 is connected to a corresponding channel 244 to supply steam to a sparge pipe 245. The steam joint is shown diagrammatically on FIG. 15 at 260 connected via pipe 261 to a steam supply (not shown).

Door 202 is also provided with a rotary joint 235. The rotary joint may be used to introduce steam into the pressure vessel 201 without passing the steam through the sparge pipes 245, to raise the pressure and/or temperature within the pressure vessel 201. The rotary joint 235 may also serve as a vent or exhaust to reduce or control the pressure within the pressure vessel 201.

Figure 19:
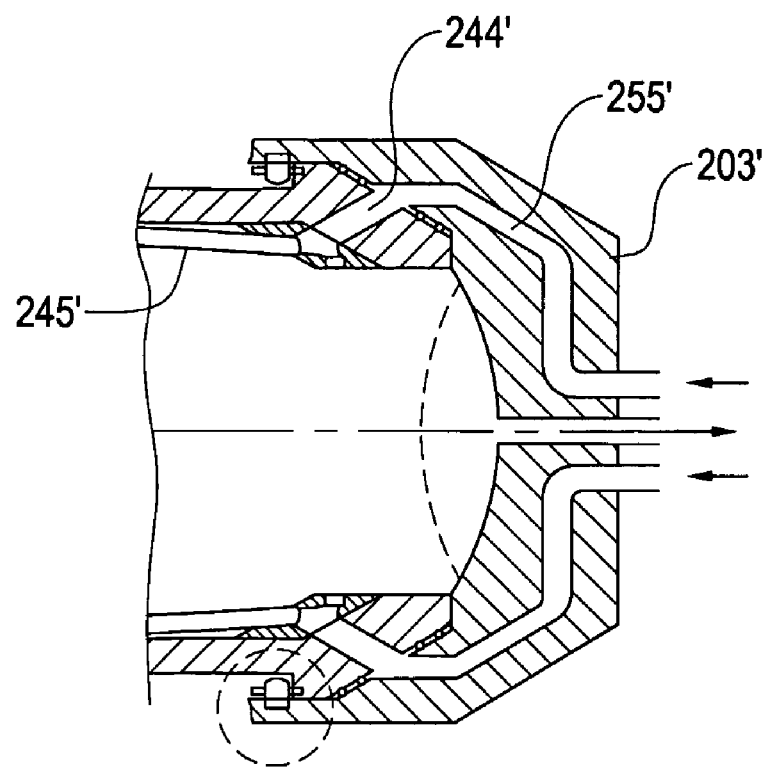
FIG. 19 is a cross-sectional view of an alternative door for the autoclave of FIG. 15.

In an alternative configuration as shown in FIG. 19, a door generally shown at 203' is provided connectable to an end part 240', but in this embodiment the channels 255' are provided located within the door 203' and connect to channels 244' in the neck part 244' to provide steam to sparge pipes 245'.

Figure 20:
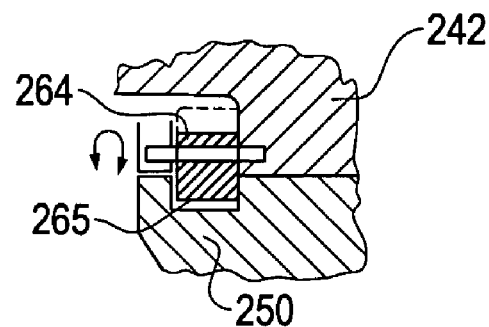
FIG. 20 is an illustration of an example locking system for the autoclave of FIG. 15.

A locking mechanism is shown by way of example in FIG. 20. In this example, the flange 242 at an edge part thereof is provided with a latch generally shown at 264 which is received within an internally directed channel 265 provided on the face of the skirt 250. The locking mechanism may of course be provided if any or each of doors 202, 203, 203' or any other locking mechanism may be provided as desired.

Figure 21:
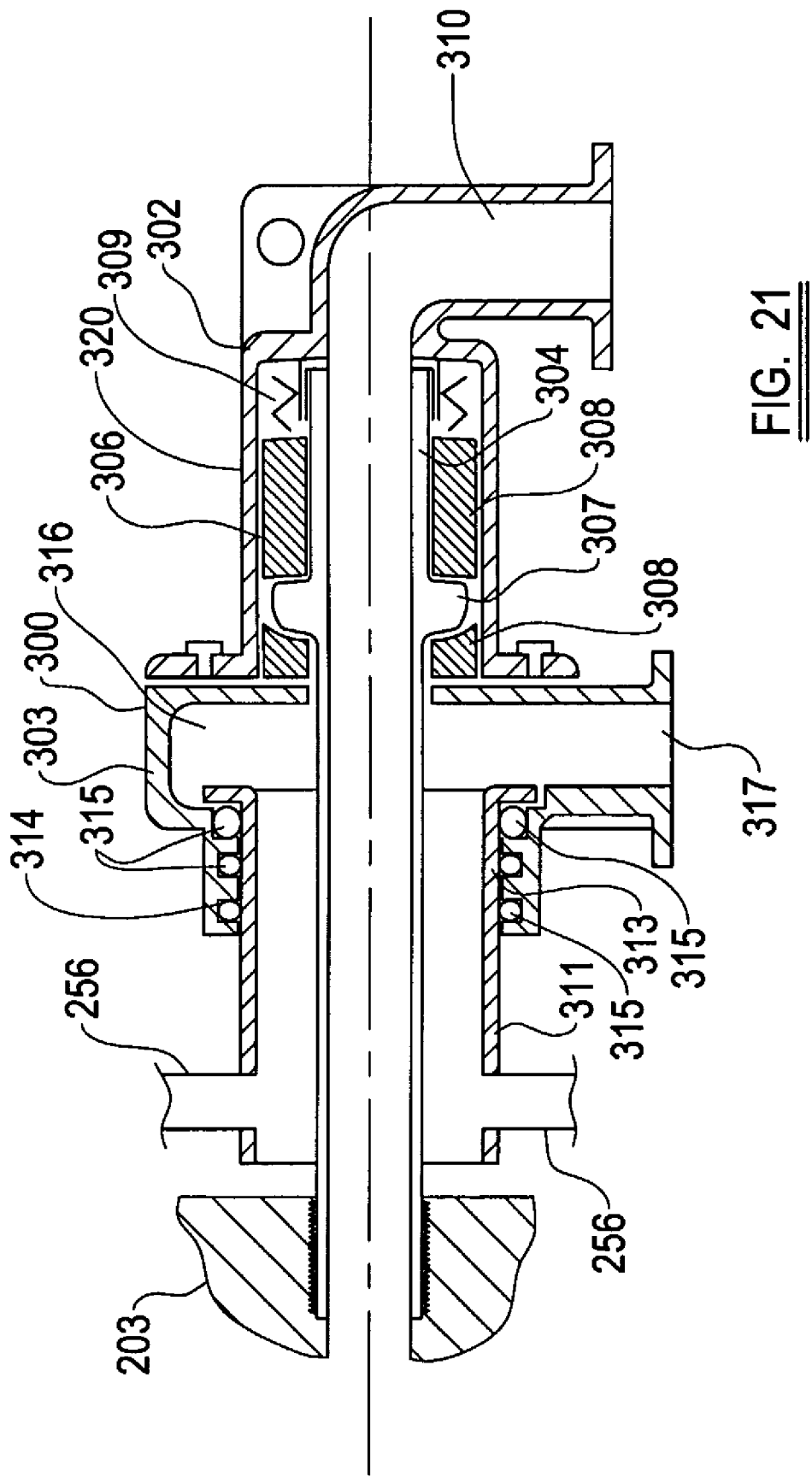
FIG. 21 is a section through a steam joint of the autoclave of FIG. 15.

An example of a rotary steam joint is shown in FIG. 21. In operation, when the door 203 is in place and clamped to the autoclave 201 and the autoclave 207 is rotating, the door 203 will rotate with the autoclave. To supply steam to the interior of the autoclave 201, a rotating steam joint is provided, generally shown at 300 in FIG. 21. The steam supply joint comprises a fixed outer case 301 having a first part 302 and a second part 303 bolted together. Received within the other case 301 is an air vent pipe 304 which is fixedly connected at one end 305 to the door 203, and at its other end is supported within the second part 302 by a rotating joint generally illustrated at 306. The vent pipe 304 includes a flange 307 which engages seals generally shown at 308 to provide a sliding seal and support the vent pipe 304. A spring mechanism 309 maintains the seal 308 and flange 307 in engagement. The interior of the pipe 304 is in flow communication with a vent connection 210 provided as part of the second part 302. To provide for supply of steam to the autoclave, a steam supply pipe 311 is shown fixedly engaged at one end 312 with the door 303 and concentric with the vent pipe 304. The other end 313 of the steam supply pipe 311 is supported by a sleeve 314 of the second part 303 of the casing 300. Seals 315 provide a rotating seal and support between the steam supply pipe 311 and support the part 314. The second part 303 further defines an annular channel 216 which is in flow communication with the steam supply pipe 311 and supplied with steam through an appropriate inlet 317. An appropriate steam supply apparatus is provided connected to the inlet 317 and vent 310 of the autoclave 301 to supply steam thereto and receive vented air and vapor therefrom.

Alternatively, the steam joint 260 may comprise a steam joint with lost motion as described above with reference to FIGS. 5 and 6 to direct steam to only the lowermost sparge pipes.

The steam supply pipe 311 is connectable to one or more pipes 156. to supply steam to the sparge pipes 245.

Figure 22:
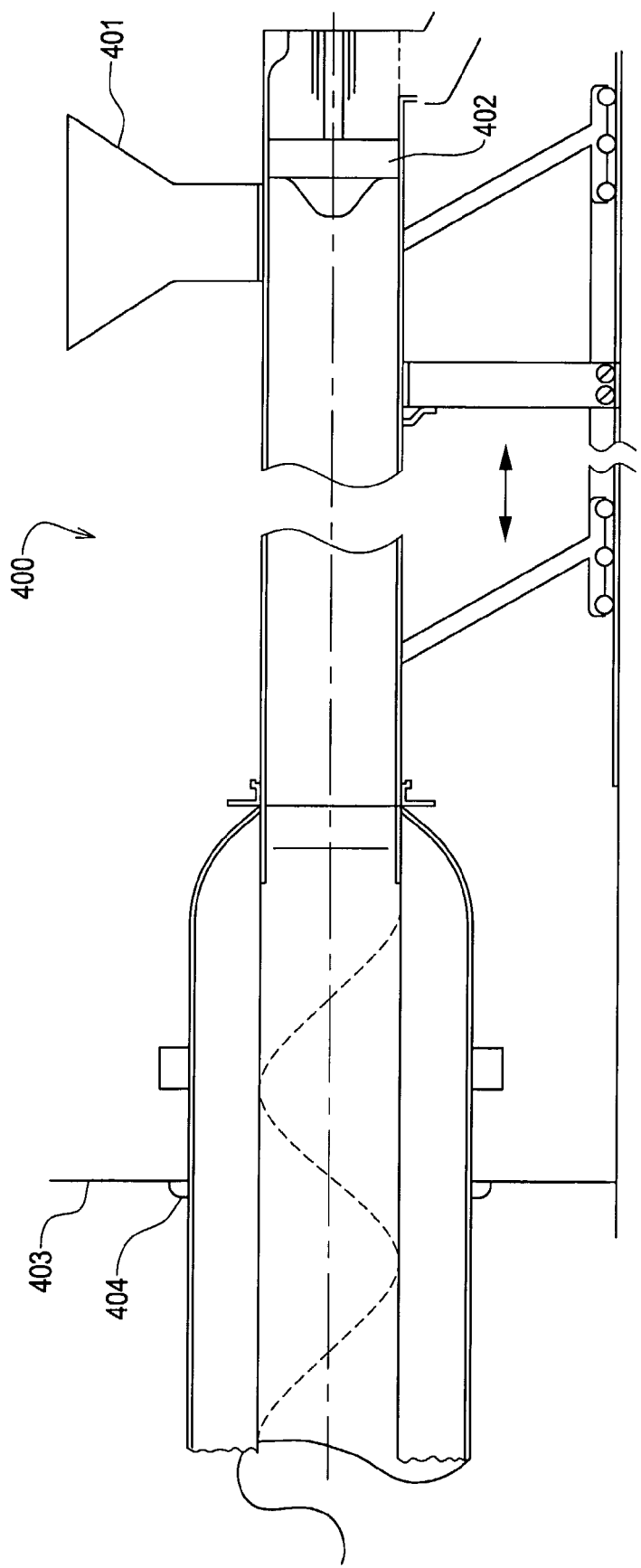
FIG. 22 is a diagrammatic view of a loading apparatus similar to the loading apparatus of FIG. 10 for use with the autoclave of FIG. 15.

Referring now to FIG. 22, a loading mechanism is shown at 400 similar to the loading mechanism of FIGS. 11 to 14. The loader is operable to introduce the waste into the upper end of the autoclave, through the end part 219 and the mouth of the neck part 230, and omits the discharge conveyor 130 and fire wall 140 of the mechanism of FIGS. 11 to 14. Waste material is introduced into the hopper 401 and is posted by piston 402 into the autoclave in similar manner of the loading apparatus 100. Unlike the loading apparatus 100, the waste material is not compacted by the piston 402 prior to being pushed into the pressure vessel 201. When the piston 402 is in its retracted position as shown in FIG. 22 waste falls from the hopper 401 in front of the piston 402. When the piston 402 is extended, the base of the hopper 401 is closed to prevent waste falling behind the piston 402. Consequently multiple strokes of the piston 402 can be used to transfer waste from the hopper 401 to the pressure vessel 201.

A barrier 403 and a seal 404 between the barrier 403 and autoclave 200 serves to separate the untreated and treated-waste-handling parts of the apparatus to avoid contamination of the treated waste.

The loading apparatus 400 is operated as follows. The door 202 is opened and the loader 400 used to introduce waste into the pressure vessel 201 of the autoclave 200. Door 202 is closed and locked and steam introduced through the steam joint 300 and through the door 203 as shown in FIG. 18 into the sparge pipes 245 around the pressure vessel 201. The pressure vessel 101 is rotated such that the helical structure 290 acts to lift waste towards the end 219 and away from the frusto-conical mouth section 220 as indicated by arrow A in FIG. 16. Gravity will act to draw the waste back down towards the frusto-conical mouth section 220, thus ensuring continuous mixing and movement of the waste material within the pressure vessel 101. The waste in the pressure vessel 201 may be treated at a pressure and for such time as appropriate, for example at 5-7 bar and 160° C.-170° C. for 30 minutes. When it is desired to empty the waste from the pressure vessel 201, the pressure and steam in the pressure vessel 201 is released through the steam joint 260 and appropriate steam supply mechanism, and door 203 opened. By rotating the pressure vessel 201 in the opposite sense, the helical stricture 290 will act to push the treated waste towards the frusto-conical end part 220 and out on to the waste handling part 294 which will carry the waste to a sorting plant or mechanism.

The autoclave as described herein is advantageous in that no rocking or tilting mechanism is required and the pressure vessel 101 is simply rotated about a longitudinal axis. As such, the mechanical reliability of the system is enhanced and the autoclave 201 is cheaper and simpler to build and operate. By providing two doors to the autoclave, introducing untreated waste through one door and dispelling treated waste through the other door, clean and treated waste are kept segregated and thus avoid the possibility of cross-contamination.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

The invention claimed is:

1. A waste treatment apparatus comprising an autoclave, the autoclave comprising a pressure vessel having a first mouth part to receive waste material and a second mouth part to discharge treated material, wherein the autoclave is rotatable about a longitudinal axis to agitate the waste material during treatment and to discharge waste material from the autoclave, wherein the first mouth part is closeable by a first door and the second mouth part is closeable by a second door, the pressure vessel having a plurality of steam outlet pipes located within the pressure vessel and a steam supply joint for supplying steam to the steam outlet pipes, wherein the pressure vessel has a steam connection collar, the steam connection collar having a plurality of channels passing therethrough connected to the steam outlet pipes, and wherein one of the doors comprises a plurality of channels, such that when the door is closed each door channel is connected to a corresponding steam connection collar channel to supply steam to the steam outlet pipe connected thereto.

2. A waste treatment apparatus according to claim 1 wherein a rotary steam joint is located on the second door and is connectable to a steam supply source and to the pipes provided on the second door.

3. A waste treatment apparatus according claim 1 wherein the autoclave is held at a fixed angle relative to the horizontal during the supply of waste treatment, the treatment of the waste material and discharge of the waste material.

4. A waste treatment apparatus according to claim 1, and further comprising a loading apparatus, the loading apparatus comprising a waste holding part to receive waste, the waste holding part having an outlet receivable in an autoclave and a transfer apparatus to eject waste from the waste holding part through the outlet.

5. A waste treatment apparatus according to claim 4 wherein the outlet comprises an end part of the waste holding part and the waste holding part is moveable to locate the outlet in the autoclave.

6. waste treatment apparatus according to claim 4 wherein the waste holding part comprises a closeable vessel and wherein the loading apparatus comprises a packing device for compressing the waste.

7. A waste treatment apparatus according to claim 6 wherein the waste holding compartment comprises a gate closeable to separate the outlet from the waste holding part to permit the waste to be compressed.

8. A waste treatment apparatus according to claim 6 wherein the packing device comprises a piston moveable in the waste holding part.

9. A waste treatment apparatus according to claim 8 wherein the transfer apparatus comprises a piston moveable in the waste holding part.

10. A waste treatment apparatus according to claim 9 wherein the transfer apparatus and the packing device comprise the same piston.

11. A waste treatment apparatus according to claim 4 wherein the waste holding part comprises a closeable inlet spaced from the outlet to receive waste.

12. A waste treatment apparatus according to claim 1 further comprising a locating part provided on the outlet to engage an end part of the autoclave to ensure that the outlet is received and aligned with the autoclave.

13. A waste treatment apparatus according to claim 4 and further comprising a discharge conveyor to receive treated waste from the autoclave.

14. A waste treatment apparatus according to claim 13 further comprising a removeable cover to cover the discharge conveyor when the outlet is received in the autoclave.

15. A waste treatment apparatus according to claim 4, wherein the pressure vessel and a steam supply joint for supplying steam to the steam outlet pipes, the outlet of the loading apparatus is received in the first mouth part of the autoclave and the steam joint is provided on the door closing the second mouth part of the autoclave.

16. A waste treatment apparatus according to claim 1, the autoclave comprising a helix located within the pressure vessel, the helix having a first helix part relatively distant from the second mouth part and a second helix part relatively close to the second mouth part, wherein the second helix part has a smaller pitch than the first helix part.

17. A waste treatment apparatus according to claim 16 wherein the helix is fixed to the pressure vessel.

18. A waste treatment apparatus according to claim 16 further comprising a third helix part located alongside the second helix part and having a smaller pitch than the second helix part.

19. A waste treatment apparatus according to claim 16 wherein the pitch of the helix structure varies continuously.

20. A waste treatment apparatus according to claim 16 wherein the helix has a plurality of parts, each part having a fixed pitch.

21. A waste treatment apparatus according to claim 16 wherein the autoclave is rotatable about its longitudinal axis in a first direction to receive waste material from the loading apparatus and in a second direction to discharge waste material to the discharge conveyor.

22. A waste treatment apparatus according to claim 1 wherein the first door and the second door are located at opposite ends of the pressure vessel on the longitudinal axis of the pressure vessel.

23. A waste treatment apparatus comprising:
an autoclave, the autoclave comprising a pressure vessel having a first mouth part to receive waste material and a second mouth part to discharge treated material, wherein the autoclave is rotatable about a longitudinal axis to agitate the waste material during treatment and to discharge waste material from the autoclave;
the first mouth part closeable by a first door and the second mouth part closeable by a second door;
the pressure vessel including a plurality of steam outlet pipes located within the pressure vessel and a steam supply joint for supplying steam to the steam outlet pipes;

a manifold joint for connection to the pressure vessel for rotation therewith and connectable to the plurality of steam outlet pipes within the autoclave a supply connection comprising a steam supply channel, and an outlet element connected to the supply connection to supply steam from the steam supply channel to the manifold, the outlet element and the manifold being operable to supply steam to a subset of the plurality of steam outlet pipes.

24. A waste treatment apparatus according to claim 23 wherein the manifold has an inlet comprising a plurality of channels connectable to the plurality of steam outlet pipes, and wherein the outlet element at least one aperture to permit flow connection between the supply channel and at least one of the plurality of manifold channels.

25. A waste treatment apparatus according to claim 23 wherein the subset of the plurality of steam pipes are located in a lower part of the autoclave.

26. A waste treatment apparatus according to claim 25 wherein the subset of the plurality of steam outlet pipes are located in a lower section of the autoclave.

27. A waste treatment apparatus according claim 23 further comprising a fixed support wherein the manifold is rotatable relative to the fixed support.

28. A waste treatment apparatus according to claim 27 wherein the supply connection and the outlet element are rotatable relative to the fixed support.

29. A waste treatment apparatus according to claim 28 wherein the fixed support comprises a stop element to limit rotation of the supply connection relative to the fixed support.

30. A waste treatment apparatus according to claim 23 further comprising an air vent channel extending from the outlet element to a vent wherein the outlet element has an aperture to connect the air vent channel to the manifold.

31. A waste treatment apparatus according to claim 30 wherein the manifold and outlet element are arranged to connect the air vent channel to at least one steam outlet pipe in the upper part of the autoclave.

32. A waste treatment apparatus according to claim 30 wherein the air vent channel comprises part of the supply connection.

33. A waste treatment apparatus according to claim 23 further comprising a support sleeve connected to the manifold, wherein a part of the slide connection is received within the support sleeve and wherein a bearing is mounted between the support sleeve and the fixed support.

34. A waste treatment apparatus according to claim 27 wherein the fixed support has a steam inlet in flow connection with the steam supply channel.

35. A waste treatment apparatus according to claim 23 wherein the steam supply joint is connected to the autoclave at one end thereof at the longitudinal axis.

36. A waste treatment apparatus according to claim 1 wherein the pressure vessel is inclined at an angle of 2° to 10° to the horizontal.

37. A waste treatment apparatus according to claim 1 wherein the second mouth part comprises a frusto-conical part, the frusto-conical part having a cone angle in the range 5° to 15°.

38. A waste treatment apparatus according to claim 1 further comprising drive means to rotate the autoclave about its longitudinal axis.

* * * * *